(12) United States Patent
Hsieh et al.

(10) Patent No.: US 8,248,713 B2
(45) Date of Patent: Aug. 21, 2012

(54) OPTICAL PHOTOGRAPHING LENS ASSEMBLY

(75) Inventors: Dung Yi Hsieh, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 301 days.

(21) Appl. No.: 12/827,957

(22) Filed: Jun. 30, 2010

(65) Prior Publication Data
US 2011/0176049 A1    Jul. 21, 2011

(30) Foreign Application Priority Data
Jan. 19, 2010  (TW) ............................... 99101369 A

(51) Int. Cl.
*G02B 13/04* (2006.01)
*G02B 13/18* (2006.01)
*G02B 9/60* (2006.01)
(52) U.S. Cl. ................... 359/753; 359/714; 359/770
(58) Field of Classification Search .................. 359/714, 359/749–753, 770
See application file for complete search history.

(56) References Cited

U.S. PATENT DOCUMENTS

| | | | |
|---|---|---|---|
| 5,682,269 A * | 10/1997 | Kimura et al. | 359/770 |
| 7,446,955 B1 | 11/2008 | Noda | |
| 7,697,220 B2 * | 4/2010 | Iyama | 359/753 |

* cited by examiner

*Primary Examiner* — Scott J Sugarman
(74) *Attorney, Agent, or Firm* — Morris Manning & Martin LLP; Tim Tingkang Xia, Esq.

(57) ABSTRACT

This invention provides an optical photographing lens assembly comprising, in order from an object side to an image side: a first lens with negative refractive power having a concave image-side surface; a second lens with positive refractive power having a concave object-side surface and a convex image-side surface; a third lens with positive refractive power having a concave object-side surface and a convex image-side surface; a fourth lens with negative refractive power; and a fifth lens with positive refractive power; wherein the optical photographing lens assembly further comprises a stop disposed between the second and third lenses; and wherein the distance on the optical axis between the fourth and fifth lenses is T45, the focal length of the optical photographing lens assembly is f, the number of the lenses with refractive power is N, and they satisfy the relations: $0.10 < (T45/f)*10 < 6.00$, $5 \leq N \leq 6$.

25 Claims, 29 Drawing Sheets

Fi. 14

| TABLE 1 | | | | | | | |
|---|---|---|---|---|---|---|---|
| (Embodiment 1) | | | | | | | |
| f = 1.65 mm, Fno = 2.03, HFOV = 80.0 deg. | | | | | | | |
| Surface # | | Curvature Radius | Thickness | Material | Index | Abbe # | Focal length |
| 0 | Object | Plano | Infinity | | | | |
| 1 | Lens 1 | 9.37830 | 0.800 | Glass | 1.729 | 54.7 | -4.92 |
| 2 | | 2.50000 | 2.740 | | | | |
| 3 | Lens 2 | -4.49980 (ASP) | 1.300 | Plastic | 1.608 | 25.7 | 8.77 |
| 4 | | -2.70705 (ASP) | 0.750 | | | | |
| 5 | Ape. Stop | Plano | 0.100 | | | | |
| 6 | Lens 3 | -7.54140 (ASP) | 1.138 | Plastic | 1.514 | 56.8 | 2.14 |
| 7 | | -1.00954 (ASP) | 0.100 | | | | |
| 8 | Lens 4 | 2.52580 (ASP) | 0.350 | Plastic | 1.608 | 25.7 | -3.32 |
| 9 | | 1.06226 (ASP) | 0.381 | | | | |
| 10 | Lens 5 | -3.62300 (ASP) | 0.930 | Plastic | 1.514 | 56.8 | 5.25 |
| 11 | | -1.68114 (ASP) | 0.500 | | | | |
| 12 | IR-Filter | Plano | 0.300 | Glass | 1.517 | 64.2 | - |
| 13 | | Plano | 0.500 | | | | |
| 14 | Cover-Glass | Plano | 0.550 | Glass | 1.517 | 64.2 | - |
| 15 | | Plano | 0.571 | | | | |
| 16 | Image | Plano | | | | | |

Fig.15

| TABLE 2 | | | | |
|---|---|---|---|---|
| Aspheric Coefficients | | | | |
| Surface # | 3 | 4 | 6 | 7 |
| k    = | -4.75456E-01 | -4.80510E+00 | 8.19010E+01 | -9.06158E-01 |
| A4 = | -6.49802E-03 | -5.17867E-03 | -1.26575E-02 | 1.20639E-01 |
| A6 = | 1.49153E-03 | 7.78896E-04 | -3.64794E-02 | -2.60800E-01 |
| A8 = | -9.09924E-06 | -2.96013E-04 | -1.20597E-01 | 2.26326E-01 |
| A10= | -3.27154E-05 | 2.05805E-05 | 6.85437E-02 | -1.06226E-01 |
| Surface # | 8 | 9 | 10 | 11 |
| k    = | -2.84851E+00 | -3.22815E+00 | 4.01811E+00 | -7.05836E-01 |
| A4 = | -2.14983E-01 | -1.02271E-01 | 1.49267E-01 | 2.92046E-02 |
| A6 = | -2.50056E-02 | 4.05373E-02 | -4.45465E-03 | -2.21022E-02 |
| A8 = | 4.70079E-02 | -5.52394E-03 | -1.37459E-02 | 1.68316E-02 |
| A10= | -7.67564E-03 | -2.57268E-03 | 1.78070E-03 | -2.69022E-03 |

Fig.16

| TABLE 3 | | | | | | |
|---|---|---|---|---|---|---|
| (Embodiment 2) | | | | | | |
| f = 1.56 mm, Fno = 2.80, HFOV = 74.7 deg. | | | | | | |
| Surface # | | Curvature Radius | Thickness | Material | Index | Abbe # | Focal length |
| 0 | Object | Plano | Infinity | | | | |
| 1 | Lens 1 | 25.42420 (ASP) | 0.700 | Plastic | 1.544 | 55.9 | -5.15 |
| 2 | | 2.50000 (ASP) | 2.641 | | | | |
| 3 | Lens 2 | -4.74400 (ASP) | 2.532 | Plastic | 1.632 | 23.4 | 7.09 |
| 4 | | -2.78072 (ASP) | 0.850 | | | | |
| 5 | Ape. Stop | Plano | 0.102 | | | | |
| 6 | Lens 3 | -8.68720 (ASP) | 0.977 | Plastic | 1.530 | 55.8 | 1.69 |
| 7 | | -0.84259 (ASP) | 0.144 | | | | |
| 8 | Lens 4 | -2.43374 (ASP) | 0.350 | Plastic | 1.632 | 23.4 | -1.57 |
| 9 | | 1.76380 (ASP) | 0.187 | | | | |
| 10 | Lens 5 | 7.12030 (ASP) | 0.842 | Plastic | 1.530 | 55.8 | 3.34 |
| 11 | | -2.25760 (ASP) | 0.500 | | | | |
| 12 | IR-Filter | Plano | 0.300 | Glass | 1.517 | 64.2 | - |
| 13 | | Plano | 0.500 | | | | |
| 14 | Cover-Glass | Plano | 0.400 | Glass | 1.517 | 64.2 | - |
| 15 | | Plano | 0.990 | | | | |
| 16 | Image | Plano | | | | | |

Fig.17

| TABLE 4 | | | | | |
|---|---|---|---|---|---|
| Aspheric Coefficients | | | | | |
| Surface # | 1 | 2 | 3 | 4 | 6 |
| k = | 1.03828E+01 | 8.31681E-02 | -1.81650E+00 | -9.58699E+00 | 4.42008E+01 |
| A4 = | 9.92403E-04 | -4.11430E-03 | 3.86085E-03 | -7.85118E-03 | -1.29705E-02 |
| A6 = | -8.04336E-06 | 1.51696E-04 | -5.46883E-04 | 2.14305E-03 | -1.24323E-01 |
| A8 = | -9.91417E-08 | 4.01677E-05 | 9.26313E-05 | -1.32213E-04 | 1.97001E-02 |
| A10= | 3.33354E-09 | -1.07047E-05 | -7.10186E-06 | -2.15532E-05 | -4.49724E-01 |
| Surface # | 7 | 8 | 9 | 10 | 11 |
| k = | -3.24633E+00 | -3.41847E+01 | -1.34269E+01 | -2.95894E+01 | -9.08160E-01 |
| A4 = | -4.67093E-02 | -2.01849E-01 | -1.14596E-01 | 1.39622E-02 | 4.78375E-02 |
| A6 = | -4.17951E-01 | -3.85314E-03 | 1.01069E-01 | 1.09071E-02 | -2.36571E-02 |
| A8 = | 4.64500E-01 | -6.23747E-02 | -5.29524E-02 | -2.90448E-03 | 1.99390E-02 |
| A10= | -3.11038E-01 | 5.60943E-02 | 1.22731E-02 | -2.02277E-03 | -5.70962E-03 |

Fig.18

| TABLE 5 | | | | | | | |
|---|---|---|---|---|---|---|---|
| (Embodiment 3) | | | | | | | |
| f = 1.54 mm, Fno = 2.40, HFOV = 69.9 deg. | | | | | | | |
| Surface # | | Curvature Radius | Thickness | Material | Index | Abbe # | Focal length |
| 0 | Object | Plano | Infinity | | | | |
| 1 | Lens 1 | 12.71470 | 1.672 | Glass | 1.729 | 54.7 | -4.58 |
| 2 | | 2.50000 | 2.450 | | | | |
| 3 | Lens 2 | -6.66670 (ASP) | 2.600 | Plastic | 1.608 | 25.7 | 6.31 |
| 4 | | -2.79514 (ASP) | 0.750 | | | | |
| 5 | Ape. Stop | Plano | 0.123 | | | | |
| 6 | Lens 3 | -4.47630 (ASP) | 0.726 | Plastic | 1.530 | 55.8 | 2.50 |
| 7 | | -1.08126 (ASP) | 0.100 | | | | |
| 8 | Lens 4 | 4.69480 (ASP) | 0.396 | Plastic | 1.608 | 25.7 | -2.37 |
| 9 | | 1.06577 (ASP) | 0.344 | | | | |
| 10 | Lens 5 | 25.00000 (ASP) | 1.700 | Plastic | 1.514 | 56.8 | 2.93 |
| 11 | | -1.56422 (ASP) | 0.500 | | | | |
| 12 | IR-Filter | Plano | 0.300 | Glass | 1.517 | 64.2 | - |
| 13 | | Plano | 0.500 | | | | |
| 14 | Cover-Glass | Plano | 0.550 | Glass | 1.517 | 64.2 | - |
| 15 | | Plano | 0.616 | | | | |
| 16 | Image | Plano | | | | | |

Fig.19

| TABLE 6 | | | | |
|---|---|---|---|---|
| Aspheric Coefficients | | | | |
| Surface # | 3 | 4 | 6 | 7 |
| k = | -7.33205E+01 | -8.44356E+00 | 1.09989E+01 | -4.89443E-01 |
| A4 = | -1.24878E-02 | -1.57383E-02 | -1.11569E-02 | 2.05449E-02 |
| A6 = | 2.19374E-03 | 5.15395E-03 | -4.27766E-02 | -1.29837E-01 |
| A8 = | -3.05480E-04 | -1.15260E-03 | -3.60139E-01 | 1.62779E-01 |
| A10= | 1.92969E-05 | 1.15857E-04 | -9.04350E-02 | -2.49388E-01 |
| Surface # | 8 | 9 | 10 | 11 |
| k = | -1.00000E+00 | -5.43261E+00 | 5.28588E+00 | -9.69667E-01 |
| A4 = | -5.24428E-01 | -1.35962E-01 | 1.12846E-01 | 4.41789E-02 |
| A6 = | 4.06739E-01 | 1.03036E-01 | -4.89327E-02 | -1.68694E-02 |
| A8 = | -2.69968E-01 | -4.36179E-02 | 1.27469E-02 | 1.39765E-02 |
| A10= | 1.12294E-01 | 8.15521E-03 | -1.36093E-03 | -2.18048E-03 |

Fig.20

| TABLE 7 | | | | | | |
|---|---|---|---|---|---|---|
| (Embodiment 4) | | | | | | |
| f = 1.34 mm, Fno = 2.40, HFOV = 97.5 deg. | | | | | | |
| Surface # | | Curvature Radius | Thickness | Material | Index | Abbe # | Focal length |
| 0 | Object | Plano | Infinity | | | | |
| 1 | Lens 1 | 12.19800 | 0.800 | Glass | 1.804 | 46.6 | -4.06 |
| 2 | | 2.50000 | 2.850 | | | | |
| 3 | Lens 2 | -3.11620 (ASP) | 2.087 | Plastic | 1.608 | 25.7 | 8.66 |
| 4 | | -2.45343 (ASP) | 1.659 | | | | |
| 5 | Ape. Stop | Plano | 0.100 | | | | |
| 6 | Lens 3 | 2.74635 (ASP) | 1.003 | Plastic | 1.514 | 56.8 | 1.69 |
| 7 | | -1.11408 (ASP) | 0.100 | | | | |
| 8 | Lens 4 | -1.05855 (ASP) | 0.350 | Plastic | 1.608 | 25.7 | -1.39 |
| 9 | | 4.78270 (ASP) | 0.139 | | | | |
| 10 | Lens 5 | 1.30004 (ASP) | 0.662 | Plastic | 1.514 | 56.8 | 2.77 |
| 11 | | 12.50000 (ASP) | 0.400 | | | | |
| 12 | IR-Filter | Plano | 0.300 | Glass | 1.517 | 64.2 | - |
| 13 | | Plano | 0.400 | | | | |
| 14 | Cover-Glass | Plano | 0.550 | Glass | 1.517 | 64.2 | - |
| 15 | | Plano | 0.606 | | | | |
| 16 | Image | Plano | | | | | |

Fig.21

| TABLE 8 | | | | |
|---|---|---|---|---|
| Aspheric Coefficients | | | | |
| Surface # | 3 | 4 | 6 | 7 |
| k = | -3.99500E+00 | -4.91846E+00 | -1.00000E+02 | -4.94615E-01 |
| A4 = | -9.16338E-03 | -1.66325E-02 | 3.73857E-01 | 1.84038E-01 |
| A6 = | -1.38936E-04 | 2.99836E-03 | -9.24675E-01 | -3.81630E-01 |
| A8 = | 1.54986E-04 | -3.37839E-04 | 1.26015E+00 | 2.60607E-01 |
| A10= | -1.15009E-05 | 1.74988E-05 | -9.96936E-01 | -1.35691E-01 |
| Surface # | 8 | 9 | 10 | 11 |
| k = | -6.78133E+00 | -1.00000E+02 | -1.01058E+01 | -2.23923E+13 |
| A4 = | -2.95267E-01 | -7.57442E-02 | 1.33330E-01 | 1.05367E-01 |
| A6 = | 4.78233E-01 | 1.49274E-01 | -1.38808E-01 | -5.37576E-02 |
| A8 = | -7.21124E-01 | -1.00368E-01 | 8.15205E-02 | 1.05548E-02 |
| A10= | 4.16426E-01 | 3.31047E-02 | -2.57140E-02 | -4.38309E-03 |

Fig.22

| TABLE 9 | | | | | | |
|---|---|---|---|---|---|---|
| (Embodiment 5) | | | | | | |
| f = 1.20 mm, Fno = 2.01, HFOV = 97.5 deg. | | | | | | |
| Surface # | | Curvature Radius | Thickness | Material | Index | Abbe # | Focal length |
| 0 | Object | Plano | Infinity | | | | |
| 1 | Lens 1 | 12.19800 | 0.800 | Glass | 1.804 | 46.6 | -4.06 |
| 2 | | 2.50000 | 2.850 | | | | |
| 3 | Lens 2 | -3.18260 (ASP) | 2.130 | Plastic | 1.608 | 25.7 | 8.16 |
| 4 | | -2.42991 (ASP) | 1.431 | | | | |
| 5 | Ape. Stop | Plano | 0.100 | | | | |
| 6 | Lens 3 | 3.75060 (ASP) | 0.953 | Plastic | 1.514 | 56.8 | 1.69 |
| 7 | | -1.03048 (ASP) | 0.100 | | | | |
| 8 | Lens 4 | -1.09395 (ASP) | 0.350 | Plastic | 1.608 | 25.7 | -1.35 |
| 9 | | 3.66480 (ASP) | 0.141 | | | | |
| 10 | Lens 5 | 1.37501 (ASP) | 0.657 | Plastic | 1.514 | 56.8 | 2.31 |
| 11 | | -7.29800 (ASP) | 0.400 | | | | |
| 12 | IR-Filter | Plano | 0.300 | Glass | 1.517 | 64.2 | - |
| 13 | | Plano | 0.400 | | | | |
| 14 | Cover-Glass | Plano | 0.550 | Glass | 1.517 | 64.2 | - |
| 15 | | Plano | 0.606 | | | | |
| 16 | Image | Plano | | | | | |

Fig.23

| TABLE 10 | | | | |
|---|---|---|---|---|
| Aspheric Coefficients | | | | |
| Surface # | 3 | 4 | 6 | 7 |
| k = | -6.36295E+00 | -5.28571E+00 | -1.00000E+02 | -8.81355E-01 |
| A4 = | -1.10414E-02 | -1.73954E-02 | 1.99064E-01 | 2.36787E-01 |
| A6 = | -2.11489E-04 | 3.15514E-03 | -5.47633E-01 | -2.85735E-01 |
| A8 = | 1.54168E-04 | -3.75652E-04 | 7.85923E-01 | 7.23026E-02 |
| A10= | -4.69972E-06 | 2.61828E-05 | -7.06147E-01 | -6.14619E-02 |
| Surface # | 8 | 9 | 10 | 11 |
| k = | -6.63004E+00 | -1.00000E+02 | -1.00241E+01 | -7.20795E+02 |
| A4 = | -2.15769E-01 | -4.89714E-02 | 1.76347E-01 | 1.01043E-01 |
| A6 = | 6.21370E-01 | 1.12972E-01 | -1.72624E-01 | 3.30134E-02 |
| A8 = | -8.64749E-01 | -8.58981E-02 | 1.07613E-01 | -5.91490E-02 |
| A10= | 4.02350E-01 | 2.51557E-02 | -4.03004E-02 | 1.01772E-02 |

Fig.24

| TABLE 11 | | | | | | |
|---|---|---|---|---|---|---|
| (Embodiment 6) | | | | | | |
| f = 1.38 mm, Fno = 2.84, HFOV = 92.5 deg. | | | | | | |
| Surface # | | Curvature Radius | Thickness | Material | Index | Abbe # | Focal length |
| 0 | Object | Plano | Infinity | | | | |
| 1 | Lens 1 | 11.41976 | 0.850 | Glass | 1.729 | 54.7 | -3.49 |
| 2 | | 2.01730 | 2.682 | | | | |
| 3 | Lens 2 | -2.93536 (ASP) | 2.505 | Plastic | 1.514 | 56.8 | 40.59 |
| 4 | | -3.31800 (ASP) | 0.140 | | | | |
| 5 | Ape. Stop | Plano | 0.089 | | | | |
| 6 | Lens 3 | 2.00867 (ASP) | 1.763 | Plastic | 1.530 | 55.8 | 1.97 |
| 7 | | -1.50644 (ASP) | 0.336 | | | | |
| 8 | Lens 4 | -1.32031 (ASP) | 0.600 | Plastic | 1.632 | 23.4 | -1.34 |
| 9 | | 2.80213 (ASP) | 0.055 | | | | |
| 10 | Lens 5 | 2.95812 (ASP) | 1.117 | Plastic | 1.530 | 55.8 | 2.51 |
| 11 | | -2.09614 (ASP) | 0.527 | | | | |
| 12 | IR-Filter | Plano | 0.300 | Glass | 1.517 | 64.2 | - |
| 13 | | Plano | 0.100 | | | | |
| 14 | Cover-Glass | Plano | 0.400 | Glass | 1.517 | 64.2 | - |
| 15 | | Plano | 0.537 | | | | |
| 16 | Image | Plano | | | | | |

Fig.25

| TABLE 12 | | | | |
|---|---|---|---|---|
| Surface # | 3 | 4 | 6 | 7 |
| k = | 2.36350E+00 | -2.59230E+00 | 0.00000E+00 | 0.00000E+00 |
| A4 = | 1.52578E-02 | 4.85553E-03 | -7.62185E-04 | 9.38290E-02 |
| A6 = | -5.81547E-03 | -1.54969E-03 | -6.88069E-03 | -5.04922E-02 |
| A8= | 8.72016E-03 | 2.27203E-03 | -3.74664E-03 | 6.30939E-03 |
| A10= | -3.01220E-03 | 6.90196E-05 | -5.69272E-03 | -1.40360E-03 |
| A12= | 2.88240E-04 | 7.73411E-04 | | |
| A14= | 1.95209E-04 | 2.52111E-04 | | |
| Surface # | 8 | 9 | 10 | 11 |
| k = | 0.00000E+00 | 0.00000E+00 | -2.94354E-01 | -1.32279E+00 |
| A4 = | 8.43058E-02 | -3.12042E-02 | -2.32651E-02 | 1.94074E-02 |
| A6 = | -7.31370E-02 | 4.14821E-03 | 6.90888E-03 | -6.35937E-03 |
| A8 = | 1.89460E-03 | -7.94276E-04 | 2.99756E-04 | 1.54677E-03 |
| A10= | -7.99277E-04 | -1.04355E-04 | -2.17248E-05 | 9.65208E-04 |
| A12= | | | -2.98193E-04 | 1.07368E-04 |
| A14= | | | 9.21870E-05 | -7.56992E-05 |

Fig.26

| TABLE 13 | | | | | | | |
|---|---|---|---|---|---|---|---|
| (Embodiment 7) | | | | | | | |
| f = 1.82 mm, Fno = 2.82, HFOV = 85.9 deg. | | | | | | | |
| Surface # | | Curvature Radius | Thickness | Material | Index | Abbe # | Focal length |
| 0 | Object | Plano | Infinity | | | | |
| 1 | Lens 1 | 12.69210 | 0.852 | Glass | 1.729 | 54.7 | -3.81 |
| 2 | | 2.21240 | 3.285 | | | | |
| 3 | Lens 2 | -3.48350 (ASP) | 1.939 | Plastic | 1.544 | 55.9 | 16.00 |
| 4 | | -2.97625 (ASP) | 0.051 | | | | |
| 5 | Ape. Stop | Plano | 0.125 | | | | |
| 6 | Lens 3 | 3.03010 (ASP) | 2.010 | Plastic | 1.530 | 55.8 | 2.49 |
| 7 | | -1.80084 (ASP) | 0.506 | | | | |
| 8 | Lens 4 | -1.69463 (ASP) | 0.500 | Plastic | 1.632 | 23.4 | -1.75 |
| 9 | | 3.57840 (ASP) | 0.100 | | | | |
| 10 | Lens 5 | 4.18910 (ASP) | 1.301 | Plastic | 1.530 | 55.8 | 3.22 |
| 11 | | -2.56869 (ASP) | 0.478 | | | | |
| 12 | IR-Filter | Plano | 0.300 | Glass | 1.517 | 64.2 | - |
| 13 | | Plano | 0.100 | | | | |
| 14 | Cover-Glass | Plano | 0.400 | Glass | 1.517 | 64.2 | - |
| 15 | | Plano | 1.151 | | | | |
| 16 | Image | Plano | | | | | |

Fig.27

| TABLE 14 | | | | |
|---|---|---|---|---|
| Surface # | 3 | 4 | 6 | 7 |
| k = | 1.60762E+00 | -1.87391E+00 | 0.00000E+00 | 0.00000E+00 |
| A4 = | -5.41337E-03 | 8.81385E-04 | 1.52027E-03 | 3.82549E-02 |
| A6 = | 1.43706E-03 | 9.00605E-04 | -3.79848E-03 | -1.30121E-02 |
| A8 = | 3.03750E-04 | -1.97733E-03 | -2.44123E-03 | 1.33858E-03 |
| A10= | 3.77760E-06 | 1.26109E-03 | -1.68366E-03 | -2.52618E-04 |
| A12= | 4.99496E-06 | 3.92499E-05 | | |
| A14= | 8.74019E-06 | 7.44121E-06 | | |
| Surface # | 8 | 9 | 10 | 11 |
| k = | 0.00000E+00 | 0.00000E+00 | -3.42340E-01 | -8.91772E-01 |
| A4 = | 2.51238E-02 | -2.04843E-02 | -1.05242E-02 | 5.44160E-03 |
| A6 = | -2.05288E-02 | 8.60036E-04 | 1.95395E-03 | -1.21459E-03 |
| A8 = | -5.10805E-04 | 2.71070E-05 | 1.45713E-05 | 4.42326E-04 |
| A10= | 6.12985E-04 | -9.28182E-05 | -1.46322E-05 | 1.12171E-04 |
| A12= | | | -1.82822E-05 | 8.55335E-06 |
| A14= | | | 4.75198E-06 | -2.47195E-06 |

Fig.28

| TABLE 15 | | | | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| f | 1.65 | 1.56 | 1.54 | 1.34 | 1.20 | 1.38 | 1.82 |
| Fno | 2.03 | 2.80 | 2.40 | 2.40 | 2.01 | 2.84 | 2.82 |
| HFOV | 80.0 | 74.7 | 69.9 | 97.5 | 97.5 | 92.5 | 85.9 |
| V3-V4 | 31.1 | 32.4 | 30.1 | 31.1 | 31.1 | 32.4 | 32.4 |
| T23/f | 0.52 | 0.61 | 0.57 | 1.31 | 1.28 | 0.17 | 0.10 |
| (T45/f)*10 | 2.31 | 1.20 | 2.23 | 1.04 | 1.18 | 0.40 | 0.55 |
| R3/R4 | 1.66 | 1.71 | 2.39 | 1.27 | 1.31 | 0.88 | 1.17 |
| |R5/R6| | 7.47 | 10.31 | 4.14 | 2.47 | 3.64 | 1.33 | 1.68 |
| f/f1 | -0.34 | -0.30 | -0.34 | -0.33 | -0.30 | -0.40 | -0.48 |
| f/f3 | 0.77 | 0.92 | 0.62 | 0.79 | 0.71 | 0.70 | 0.73 |
| f4/f5 | -0.63 | -0.47 | -0.81 | -0.50 | -0.58 | -0.53 | -0.54 |
| f/f12 | 0.01 | 0.13 | 0.14 | 0.03 | 0.05 | -0.24 | -0.16 |
| N | 5 | 5 | 5 | 5 | 5 | 5 | 5 |
| SL/TTL | 0.48 | 0.43 | 0.43 | 0.37 | 0.37 | 0.48 | 0.52 |
| TTL/ImgH | 4.36 | 4.79 | 5.30 | 5.87 | 5.74 | 5.98 | 5.23 |

Fig.29

OPTICAL PHOTOGRAPHING LENS ASSEMBLY

BACKGROUND OF THE INVENTION

1. Field of the Invention

The present invention relates to an optical photographing lens assembly, and more particularly, to a compact optical photographing lens assembly with a wide field of view.

2. Description of the Prior Art

In recent years, optical photographing lens assemblies have been applied to a wide variety of apparatuses such as mobile phone camera, web cam, automotive lens assembly, image monitor, etc., and the sensor of a general photographing lens assembly is none other than CCD (charge coupled device) or CMOS Sensor (Complementary Metal Oxide Semiconductor Sensor). Furthermore, as advanced semiconductor manufacturing technology has allowed the pixel size of sensors to be reduced and photographing lens assemblies have become more compact and feature high resolution, there is an increasing demand for photographing lens assemblies featuring better image quality.

Generally, a conventional photographing lens assembly with a wide field of view, such as the four-element lens assembly disclosed in U.S. Pat. No. 7,446,955, is arranged in such a manner that the front lens group has negative refractive power and the rear lens group has positive refractive power, thereby forming an inverse telephoto structure to achieve a wide field of view. Though such an arrangement facilitates the enlargement of the field of view, the correction to the aberrations of the system cannot be effectively made due to the inclusion of only one lens element in the rear lens group. As the demand for high-resolution photographing lens assemblies with a wide field of view is increasing, a need exists in the art for an optical photographing lens assembly, which has a wide field of view and high image quality and maintains a moderate total track length.

SUMMARY OF THE INVENTION

The present invention provides an optical photographing lens assembly comprising, in order from an object side to an image side: a first lens with negative refractive power having a concave image-side surface; a second lens with positive refractive power having a concave object-side surface and a convex image-side surface; a third lens with positive refractive power having a concave object-side surface and a convex image-side surface; a fourth lens with negative refractive power; and a fifth lens with positive refractive power; wherein a stop is disposed between the second and third lenses; wherein at least two of the third, fourth and fifth lenses are configured to each have at least one aspheric surface; and wherein the distance on the optical axis between the fourth and fifth lenses is T45, the focal length of the optical photographing lens assembly is f, the number of the lenses with refractive power is N, and they satisfy the relations: $0.10<(T45/f)*10<6.00$, $5 \leq N \leq 6$.

The present invention provides another optical photographing lens assembly comprising five lenses with refractive power, in order from the object side to the image side: a first lens with negative refractive power having a convex object-side surface and a concave image-side surface; a second lens with positive refractive power having a concave object-side surface and a convex image-side surface; a third lens with positive refractive power; a fourth lens with negative refractive power, the object-side and image-side surfaces thereof being aspheric; and a fifth lens with positive refractive power, the object-side and image-side surfaces thereof being aspheric; wherein the distance on the optical axis between the second and third lenses is T23, the distance on the optical axis between the fourth and fifth lenses is T45, the focal length of the optical photographing lens assembly is f, the radius of curvature of the object-side surface of the third lens is R5, the radius of curvature of the image-side surface of the third lens is R6, the focal length of the third lens is f3, and they satisfy the relations: $0.00<T23/f<1.50$, $0.10<(T45/f)*10<6.00$, $1.25<|R5/R6|$, $0.50<f/f3<1.40$.

The present invention provides yet another optical photographing lens assembly comprising five lenses with refractive power, in order from the object side to the image side: a first lens with negative refractive power having a concave image-side surface; a second lens with positive refractive power having a concave object-side surface and a convex image-side surface; a third lens with positive refractive power; a fourth lens with negative refractive power; and a fifth lens with positive refractive power; wherein the third, fourth and fifth lenses are meniscus lenses.

Such an arrangement of optical lenses facilitates the enlargement of the field of view of the optical photographing lens assembly, the attenuation of the sensitivity of the system and the reduction of the total track length.

In the present optical photographing lens assembly, the first lens has negative refractive power and a concave image-side surface so that the field of view of the optical photographing lens assembly can be favorably enlarged; the second lens has positive refractive power, a concave object-side surface and a convex image-side surface so that the aberrations caused by the first lens with negative refractive power can be favorably corrected; the third lens with positive refractive power provides the majority of the refractive power of the system so that the total track length of the optical photographing lens assembly can be favorably reduced; the fourth lens has negative refractive power so that the chromatic aberration of the optical photographing lens assembly can be favorably corrected; the fifth lens has positive refractive power so that the proportion of positive refractive power contributed by the third lens can be effectively reduced, thereby facilitating the attenuation of the sensitivity of the system.

In the present optical photographing lens assembly, when the first lens has a convex object-side surface and a concave image-side surface, the field of view of the optical photographing lens assembly can be favorably enlarged, and the refraction of the incident light can be reduced to prevent the aberrations from becoming too large. Consequently, a balance between the enlargement of the field of view of the system and the correction of the aberrations can be attained more favorably. When the third lens has a concave object-side surface and a convex image-side surface and the fourth lens has a convex object-side surface and a concave image-side surface, the astigmatism of the optical photographing lens assembly can be corrected more favorably. When the third, fourth and fifth lenses are meniscus lenses, the sensitivity of the system can be attenuated more effectively, and the high order aberrations can be prevented from becoming too large. As a result, the image quality of the optical photographing lens assembly can be improved.

In the present optical photographing lens assembly, the stop can be disposed between the second and third lenses. For an optical system with a wide field of view, it requires special effort to correct the distortion and chromatic aberration of magnification, and the correction can be made by placing the stop in a location where the refractive power of the system is balanced. In the present optical photographing lens assembly, if a stop is disposed between the second and third lenses, the arrangement is adopted for the purpose of attaining a balance between the reduction of the total track length of the optical photographing lens assembly and the obtaining of a wide field of view. Such an arrangement also facilitates the attenuation of the sensitivity of the system.

BRIEF DESCRIPTION OF THE DRAWINGS

FIG. 15 is TABLE 1 which lists the optical data of the first embodiment.

FIG. 16 is TABLE 2 which lists the aspheric surface data of the first embodiment.

FIG. 17 is TABLE 3 which lists the optical data of the second embodiment.

FIG. 18 is TABLE 4 which lists the aspheric surface data of the second embodiment.

FIG. 19 is TABLE 5 which lists the optical data of the third embodiment.

FIG. 20 is TABLE 6 which lists the aspheric surface data of the third embodiment.

FIG. 21 is TABLE 7 which lists the optical data of the fourth embodiment.

FIG. 22 is TABLE 8 which lists the aspheric surface data of the fourth embodiment.

FIG. 23 is TABLE 9 which lists the optical data of the fifth embodiment.

FIG. 24 is TABLE 10 which lists the aspheric surface data of the fifth embodiment.

FIG. 25 is TABLE 11 which lists the optical data of the sixth embodiment.

FIG. 26 is TABLE 12 which lists the aspheric surface data of the sixth embodiment.

FIG. 27 is TABLE 13 which lists the optical data of the seventh embodiment.

FIG. 28 is TABLE 14 which lists the aspheric surface data of the seventh embodiment.

FIG. 29 is TABLE 15 which lists the data of the respective embodiments resulting from the equations.

DETAILED DESCRIPTION OF THE PREFERRED EMBODIMENTS

Figure 1:
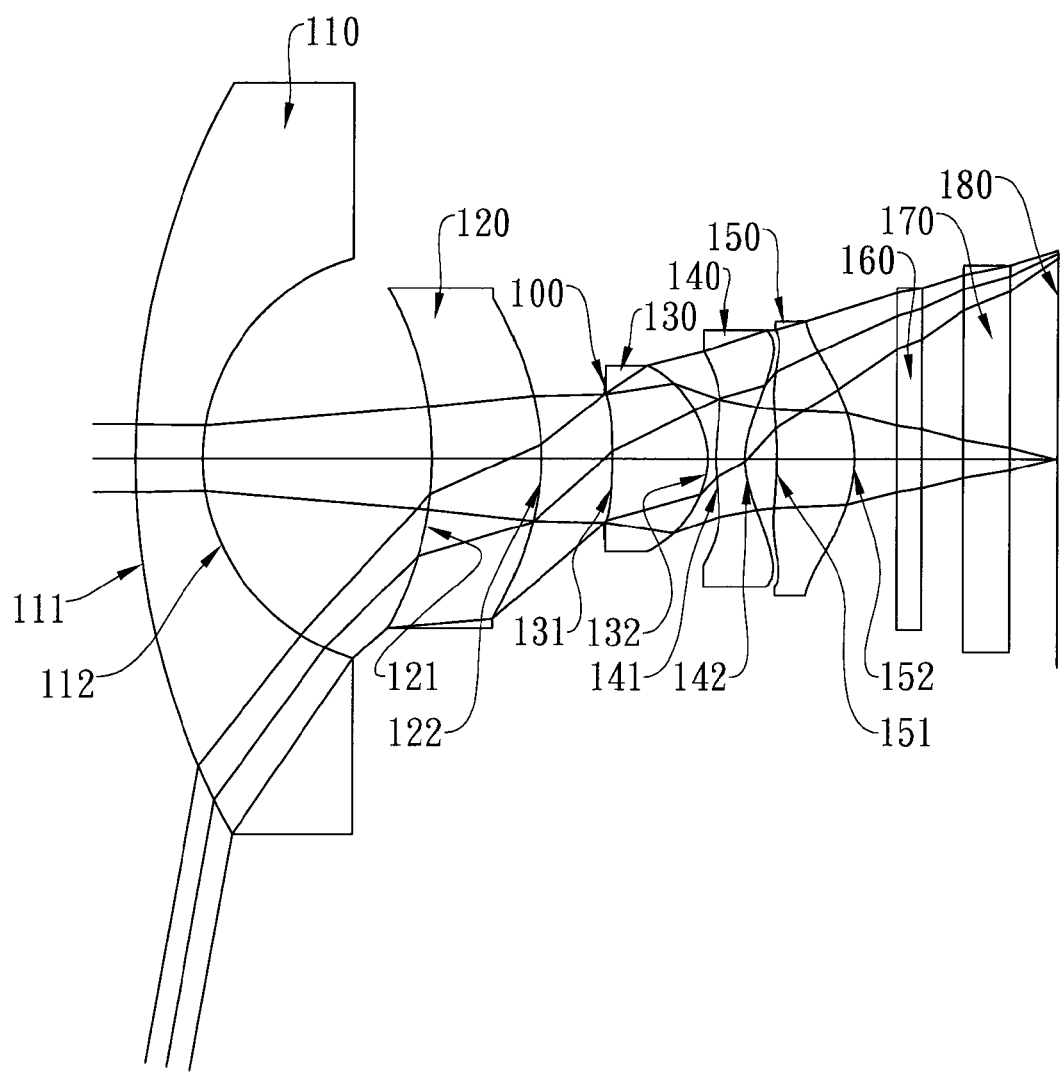
FIG. 1 shows an optical photographing lens assembly in accordance with a first embodiment of the present invention.

The present invention provides an optical photographing lens assembly comprising, in order from an object side to an image side: a first lens with negative refractive power having a concave image-side surface; a second lens with positive refractive power having a concave object-side surface and a convex image-side surface; a third lens with positive refractive power having a concave object-side surface and a convex image-side surface; a fourth lens with negative refractive power; and a fifth lens with positive refractive power; wherein a stop is disposed between the second and third lenses; wherein at least two of the third, fourth and fifth lenses are configured to each have at least one aspheric surface; and wherein the distance on the optical axis between the fourth and fifth lenses is T45, the focal length of the optical photographing lens assembly is f, the number of the lenses with refractive power is N, and they satisfy the relations: $0.10 < (T45/f)*10 < 6.00$, $5 \leq N \leq 6$.

When the relation of $0.10 < (T45/f)*10 < 6.00$ is satisfied, the high order aberrations of the optical photographing lens assembly can be favorably corrected. Preferably, T45 and f satisfy the relation: $0.70 < (T45/f)*10 < 3.00$. When the relation of $5 \leq N \leq 6$ is satisfied, a balance between the reduction of the total track length of the optical photographing lens assembly and the correction of the aberrations of the system can be favorably attained, and the production cost can be effectively controlled as well. Preferably, N satisfies the relation: $N=5$.

In the aforementioned optical photographing lens assembly, it is preferable that the first lens has a convex object-side surface so that the field of view of the optical photographing lens assembly can be favorably enlarged, and the refraction of the incident light can be reduced to prevent the aberrations from becoming too large. Preferably, the fourth lens has a convex object-side surface and a concave image-side surface so that the astigmatism of the system can be favorably corrected.

In the aforementioned optical photographing lens assembly, it is preferable that the object-side and image-side surfaces of the fifth lens are both aspheric. Aspheric surfaces can be easily made into non-spherical profiles, allowing more design parameter freedom which can be used to reduce aberrations and the number of the lenses. Consequently, the total track length of the optical photographing lens assembly can be effectively reduced and the image quality of the system can be improved as well. Preferably, the fourth and fifth lenses are made of plastic material. Plastic lenses are favorable not only for the formation of aspheric surfaces, but also for the significant reduction of the production cost.

In the aforementioned optical photographing lens assembly, the focal length of the optical photographing lens assembly is f, the focal length of the third lens is f3, and they preferably satisfy the relation: $0.50 < f/f3 < 1.40$. When the above relation is satisfied, the refractive power of the third lens is more balanced so that the total track length of the system can be effectively controlled. The satisfaction of above relation also prevents the high order spherical aberration from becoming too large, so that the image quality of the system can be improved. And it will be more preferable that f and f3 satisfy the relation: $0.65 < f/f3 < 1.00$.

In the aforementioned optical photographing lens assembly, the focal length of the fourth lens is f4, the focal length of the fifth lens is f5, and they preferably satisfy the relation:

−1.0<f4/f5<−0.4. When the above relation is satisfied, the refractive power of the rear lens group is more balanced, thereby facilitating the attenuation of the sensitivity of the system and the correction of the high order aberrations.

The aforementioned optical photographing lens assembly further comprises an electronic sensor on which an object is imaged. The distance on the optical axis between the stop and the electronic sensor is SL, the distance on the optical axis between the object-side surface of the first lens and the electronic sensor is TTL, and they satisfy the relation: 0.30<SL/TTL<0.55. When the above relation is satisfied, a balance between the telecentric feature and the wide angle feature can be favorably attained. In the aforementioned optical photographing lens assembly, half of the diagonal length of the effective pixel area of the electronic sensor is ImgH, and it preferably satisfies the relation: TTL/ImgH<6.0. The satisfaction of the above relation is favorable for the optical photographing lens assembly to maintain a compact form.

In the aforementioned optical photographing lens assembly, the radius of curvature of the object-side surface of the third lens is R5, the radius of curvature of the image-side surface of the third lens is R6, and they preferably satisfy the relation: 1.25<|R5/R6|. When the above relation is satisfied, the spherical aberration of the optical photographing lens assembly can be favorably corrected.

In the aforementioned optical photographing lens assembly, the focal length of the optical photographing lens assembly is f, the focal length of the first lens is f1, and they preferably satisfy the relation: −0.40<f/f1<−0.25. When the above relation is satisfied, a balance between the enlargement of the field of view of the optical photographing lens assembly and the reduction of the total track length of the system can be favorably attained.

In the aforementioned optical photographing lens assembly, the focal length of the optical photographing lens assembly is f, the composite focal length of the first and second lenses is f12, and they preferably satisfy the relation: 0.08<f/f12<0.30. When the above relation is satisfied, the sensitivity of the system can be favorably attenuated to improve the image quality.

In the aforementioned optical photographing lens assembly, the radius of curvature of the object-side surface of the second lens is R3, the radius of curvature of the image-side surface of the second lens is R4, and they preferably satisfy the relation: 1.2<R3/R4<4.5. When the above relation is satisfied, the aberrations caused by the first lens can be favorably corrected to improve the image quality of the system.

In the aforementioned optical photographing lens assembly, the Abbe number of the third lens is V3, the Abbe number of the fourth lens is V4, and they preferably satisfy the relation: 23.0<V3−V4<38.0. When the above relation is satisfied, the optical photographing lens assembly's capability to correct the chromatic aberration can be favorably enhanced.

The present invention provides another optical photographing lens assembly comprising five lenses with refractive power, in order from the object side to the image side: a first lens with negative refractive power having a convex object-side surface and a concave image-side surface; a second lens with positive refractive power having a concave object-side surface and a convex image-side surface; a third lens with positive refractive power; a fourth lens with negative refractive power, the object-side and image-side surfaces thereof being aspheric; and a fifth lens with positive refractive power, the object-side and image-side surfaces thereof being aspheric; wherein the distance on the optical axis between the second and third lenses is T23, the distance on the optical axis between the fourth and fifth lenses is T45, the focal length of the optical photographing lens assembly is f, the radius of curvature of the object-side surface of the third lens is R5, the radius of curvature of the image-side surface of the third lens is R6, the focal length of the third lens is f3, and they satisfy the relations: 0.00<T23/f<1.50, 0.10<(T45/f)*10<6.00, 1.25<|R5/R6|, 0.50<f/f3<1.40.

When the relation of 0.00<T23/f<1.50 is satisfied, the lenses can be spaced closer together to facilitate reducing the total track length of the optical photographing lens assembly. When the relation of 0.10<(T45/f)*10<6.00 is satisfied, the high order aberrations of the optical photographing lens assembly can be favorably corrected to improve the image quality of the system. Preferably, T45 and f satisfy the relation: 0.70<(T45/f)*10<3.00. When the relation of 1.25<|R5/R6| is satisfied, the spherical aberration of the optical photographing lens assembly can be favorably corrected. When the relation of 0.50<f/f3<1.40 is satisfied, the refractive power of the third lens is more balanced so that the total track length of the system can be effectively controlled. The satisfaction of the above relation also prevents the high order spherical aberration from becoming too large, so that the image quality of the system can be improved. Preferably, f and f3 satisfy the relation: 0.65<f/f3<1.00.

In the aforementioned optical photographing lens assembly, it is preferable that at least one of the object-side and image-side surfaces of the fifth lens is provided with at least one inflection point so that the angle at which the light is projected onto the sensor from the off-axis field can be effectively reduced to further correct the off-axis aberrations. Preferably, the fifth lens is made of plastic material. Plastic lenses are favorable not only for the formation of aspheric surfaces, but also for the significant reduction of the production cost.

In the aforementioned optical photographing lens assembly, the Abbe number of the third lens is V3, the Abbe number of the fourth lens is V4, and they preferably satisfy the relation: 23.0<V3−V4<38.0. When the above relation is satisfied, the optical photographing lens assembly's capability to correct the chromatic aberration can be favorably enhanced.

In the aforementioned optical photographing lens assembly, it is preferable that a stop is disposed between the second and third lenses so that a balance between the reduction of the total track length of the optical photographing lens assembly and the obtaining of a wide field of view can be attained. Such an arrangement also facilitates the attenuation of the sensitivity of the system.

In the aforementioned optical photographing lens assembly, the focal length of the fourth lens is f4, the focal length of the fifth lens is f5, and they preferably satisfy the relation: −1.0<f4/f5<−0.4. When the above relation is satisfied, the refractive power of the rear lens group is more balanced, thereby facilitating the attenuation of the sensitivity of the system and the correction of the high order aberrations.

In the aforementioned optical photographing lens assembly, the radius of curvature of the object-side surface of the second lens is R3, the radius of curvature of the image-side surface of the second lens is R4, and they preferably satisfy the relation: 1.2<R3/R4<4.5. When the above relation is satisfied, the aberrations caused by the first lens can be favorably corrected to improve the image quality of the system.

The present invention provides yet another optical photographing lens assembly comprising five lenses with refractive power, in order from the object side to the image side: a first lens with negative refractive power having a concave image-side surface; a second lens with positive refractive power having a concave object-side surface and a convex image-side surface; a third lens with positive refractive power; a fourth lens with negative refractive power; and a fifth lens with positive refractive power; wherein the third, fourth and fifth lenses are meniscus lenses. The meniscus lens described herein is a lens whose one surface is convex at the portion thereof proximate to the optical axis while whose the other surface is concave at the portion thereof proximate to the optical axis. Specifically, if the portion of the object-side surface of the meniscus lens proximate to the optical axis is convex, the portion of the image-side surface of the meniscus lens proximate to the optical axis will be concave; if the portion of the object-side surface of the meniscus lens proximate to the optical axis is concave, the portion of the image-side surface of the meniscus lens proximate to the optical axis will be convex.

In the aforementioned optical photographing lens assembly, it is preferable that at least two of the third, fourth and fifth lenses are configured to each have at least one aspheric surface. Aspheric surfaces can be easily made into non-spherical profiles, allowing more design parameter freedom which can be used to reduce aberrations and the number of the lenses. Accordingly, the total track length of the optical photographing lens assembly can be effectively reduced, and the image quality of the system can be improved.

In the aforementioned optical photographing lens assembly, the focal length of the optical photographing lens assembly is f, the focal length of the third lens is f3, and they preferably satisfy the relation: $0.65<f/f3<1.00$. When the above relation is satisfied, the refractive power of the third lens is more balanced so that the total track length of the system can be effectively controlled. The satisfaction of the above relation also prevents the high order spherical aberration from becoming too large, so that the image quality of the system can be improved.

In the aforementioned optical photographing lens assembly, the radius of curvature of the object-side surface of the third lens is R5, the radius of curvature of the image-side surface of the third lens is R6, and they preferably satisfy the relation: $1.25<|R5/R6|$. When the above relation is satisfied, the spherical aberration of the optical photographing lens assembly can be favorably corrected.

In the aforementioned optical photographing lens assembly, the Abbe number of the third lens is V3, the Abbe number of the fourth lens is V4, and they preferably satisfy the relation: $23.0<V3-V4<38.0$. When the above relation is satisfied, the optical photographing lens assembly's capability to correct the chromatic aberration can be favorably enhanced.

In the aforementioned optical photographing lens assembly, it is preferable that a stop is disposed between the second and third lenses so that a balance between the reduction of the total track length of the optical photographing lens assembly and the obtaining of a wide field of view can be attained.

In the present optical photographing lens assembly, the lenses can be made of glass or plastic material. If the lenses are made of glass, there is more freedom in distributing the refractive power of the system. If plastic material is adopted to produce the lenses, the production cost will be reduced effectively. Additionally, the surfaces of the lenses can be aspheric and easily made into non-spherical profiles, allowing more design parameter freedom which can be used to reduce aberrations and the number of the lenses. Consequently, the total track length of the optical photographing lens assembly can be reduced effectively.

In the present optical photographing lens assembly, if a lens has a convex surface, it means the portion of the surface proximate to the optical axis is convex; if a lens has a concave surface, it means the portion of the surface proximate to the optical axis is concave.

Figure 2:
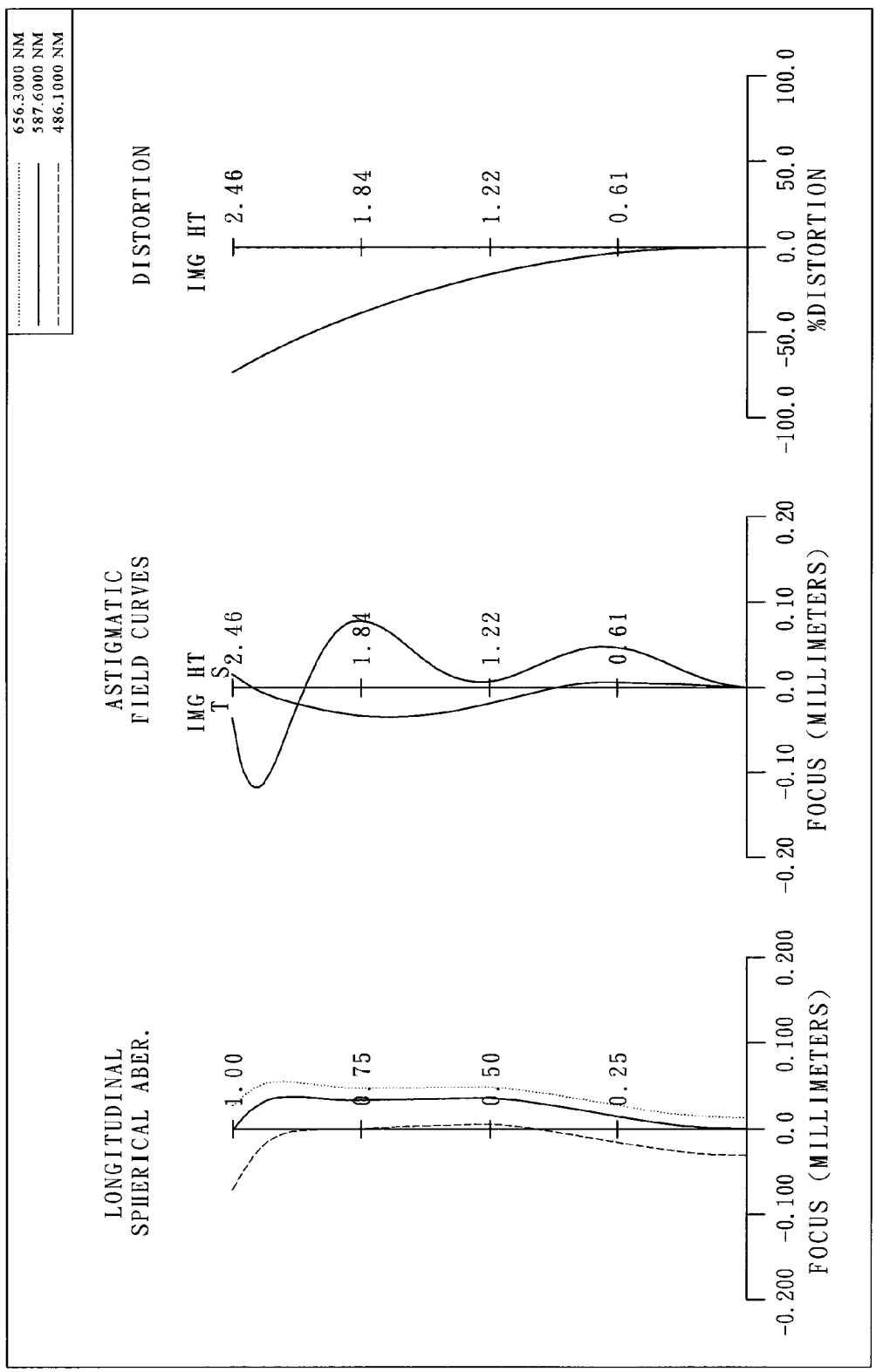
FIG. 2 shows the aberration curves of the first embodiment of the present invention.

Preferred embodiments of the present invention will be described in the following paragraphs by referring to the accompanying drawings FIG. 1 shows an optical photographing lens assembly in accordance with a first embodiment of the present invention, and FIG. 2 shows the aberration curves of the first embodiment of the present invention. The optical photographing lens assembly of the first embodiment of the present invention mainly comprises five lenses, in order from an object side to an image side: a glass first lens 110 with negative refractive power having a convex object-side surface 111 and a concave image-side surface 112; a plastic second lens 120 with positive refractive power having a concave object-side surface 121 and a convex image-side surface 122, the object-side and image-side surfaces 121 and 122 thereof being aspheric; a plastic third lens 130 with positive refractive power having a concave object-side surface 131 and a convex image-side surface 132, the object-side and image-side surfaces 131 and 132 thereof being aspheric; a plastic fourth lens 140 with negative refractive power having a convex object-side surface 141 and a concave image-side surface 142, the object-side and image-side surfaces 141 and 142 thereof being aspheric; and a plastic fifth lens 150 with positive refractive power having a concave object-side surface 151 and a convex image-side surface 152, the object-side and image-side surfaces 151 and 152 thereof being aspheric; wherein a stop 100 is disposed between the second lens 120 and the third lens 130; wherein an IR filter 160 and a cover glass 170 are sequentially disposed between the image-side surface 152 of the fifth lens 150 and an image plane 180; and wherein the IR filter 160 and the cover glass 170 are made of glass and have no influence on the focal length of the optical photographing lens assembly.

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical photographing lens assembly, the focal length of the optical photographing lens assembly is f, and it satisfies the relation: $f=1.65$ (mm).

In the first embodiment of the present optical photographing lens assembly, the f-number of the optical photographing lens assembly is Fno, and it satisfies the relation: $Fno=2.03$.

In the first embodiment of the present optical photographing lens assembly, half of the maximal field of view of the optical photographing lens assembly is HFOV, and it satisfies the relation: $HFOV=80.0$ deg.

In the first embodiment of the present optical photographing lens assembly, the Abbe number of the third lens 130 is V3, the Abbe number of the fourth lens 140 is V4, and they satisfy the relation: $V3-V4=31.1$.

In the first embodiment of the present optical photographing lens assembly, the distance on the optical axis between the second lens 120 and the third lens 130 is T23, the focal length of the optical photographing lens assembly is f, and they satisfy the relation: T23/f=0.52.

In the first embodiment of the present optical photographing lens assembly, the distance on the optical axis between the fourth lens 140 and the fifth lens 150 is T45, the focal length of the optical photographing lens assembly is f, and they satisfy the relation: (T45/f)*10=2.31.

In the first embodiment of the present optical photographing lens assembly, the radius of curvature of the object-side surface 121 of the second lens 120 is R3, the radius of curvature of the image-side surface 122 of the second lens 120 is R4, and they satisfy the relation: R3/R4=1.66.

In the first embodiment of the present optical photographing lens assembly, the radius of curvature of the object-side surface 131 of the third lens 130 is R5, the radius of curvature of the image-side surface 132 of the third lens 130 is R6, and they satisfy the relation: |R5/R6|=7.47.

In the first embodiment of the present optical photographing lens assembly, the focal length of the optical photographing lens assembly is f, the focal length of the first lens 110 is f1, and they satisfy the relation: f/f1=−0.34.

In the first embodiment of the present optical photographing lens assembly, the focal length of the optical photographing lens assembly is f, the focal length of the third lens 130 is f3, and they satisfy the relation: f/f3=0.77.

In the first embodiment of the present optical photographing lens assembly, the focal length of the fourth lens 140 is f4, the focal length of the fifth lens 150 is f5, and they satisfy the relation: f4/f5=−0.63.

In the first embodiment of the present optical photographing lens assembly, the focal length of the optical photographing lens assembly is f, the composite focal length of the first lens 110 and the second lens 120 is f12, and they satisfy the relation: f/f12=0.01.

In the first embodiment of the present optical photographing lens assembly, the number of the lenses with refractive power is N, and it satisfies the relation: N=5.

In the first embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.48, TTL/ImgH=4.36.

The detailed optical data of the first embodiment is shown in FIG. 15 (TABLE 1), and the aspheric surface data is shown in FIG. 16 (TABLE 2), wherein the units of the radius of curvature, the thickness and the focal length are expressed in mm, and HFOV is half of the maximal field of view.

Figure 3:
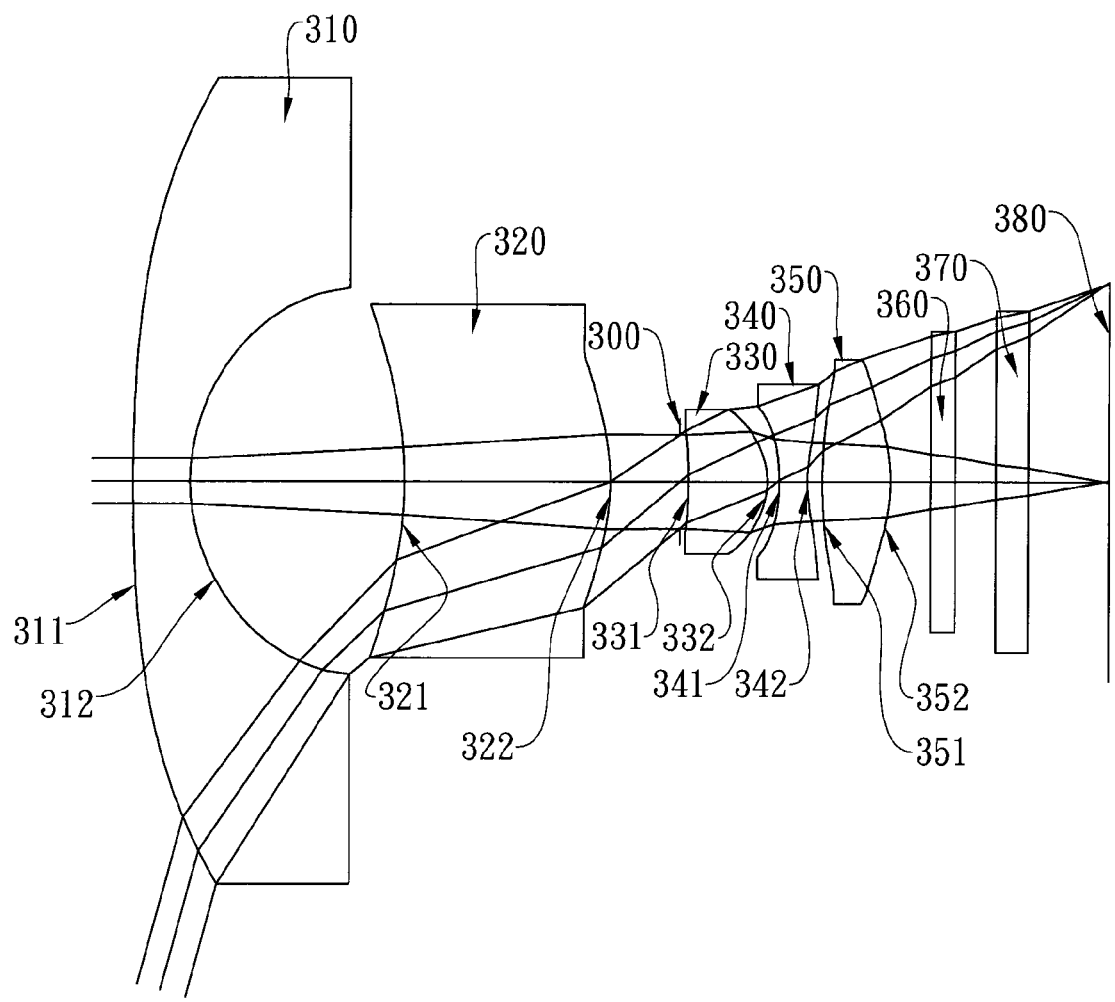
FIG. 3 shows an optical photographing lens assembly in accordance with a second embodiment of the present invention.
Figure 4:
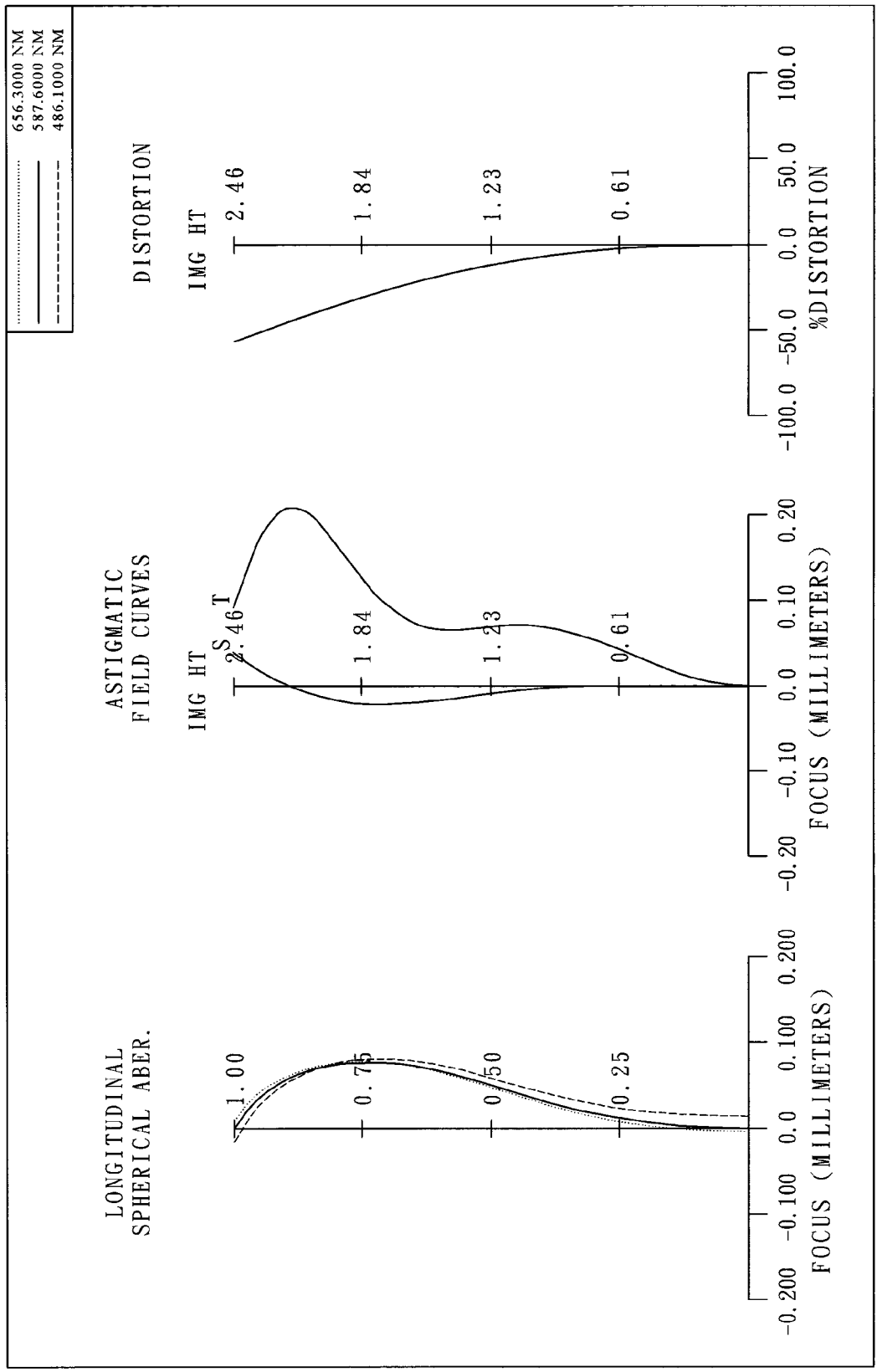
FIG. 4 shows the aberration curves of the second embodiment of the present invention.

FIG. 3 shows an optical photographing lens assembly in accordance with a second embodiment of the present invention, and FIG. 4 shows the aberration curves of the second embodiment of the present invention. The optical photographing lens assembly of the second embodiment of the present invention mainly comprises five lenses, in order from the object side to the image side: a plastic first lens 310 with negative refractive power having a convex object-side surface 311 and a concave image-side surface 312, the object-side and image-side surfaces 311 and 312 thereof being aspheric; a plastic second lens 320 with positive refractive power having a concave object-side surface 321 and a convex image-side surface 322, the object-side and image-side surfaces 321 and 322 thereof being aspheric; a plastic third lens 330 with positive refractive power having a concave object-side surface 331 and a convex image-side surface 332, the object-side and image-side surfaces 331 and 332 thereof being aspheric; a plastic fourth lens 340 with negative refractive power having a concave object-side surface 341 and a concave image-side surface 342, the object-side and image-side surfaces 341 and 342 thereof being aspheric; and a plastic fifth lens 350 with positive refractive power having a convex object-side surface 351 and a convex image-side surface 352, the object-side and image-side surfaces 351 and 352 thereof being aspheric; wherein a stop 300 is disposed between the second lens 320 and the third lens 330; wherein an IR filter 360 and a cover glass 370 are sequentially disposed between the image-side surface 352 of the fifth lens 350 and an image plane 380; and wherein the IR filter 360 and the cover glass 370 are made of glass and have no influence on the focal length of the optical photographing lens assembly.

The equation of the aspheric surface profiles of the second embodiment has the same form as that of the first embodiment.

In the second embodiment of the present optical photographing lens assembly, the focal length of the optical photographing lens assembly is f, and it satisfies the relation: f=1.56 (mm).

In the second embodiment of the present optical photographing lens assembly, the f-number of the optical photographing lens assembly is Fno, and it satisfies the relation: Fno=2.80.

In the second embodiment of the present optical photographing lens assembly, half of the maximal field of view of the optical photographing lens assembly is HFOV, and it satisfies the relation: HFOV=74.7 deg.

In the second embodiment of the present optical photographing lens assembly, the Abbe number of the third lens 330 is V3, the Abbe number of the fourth lens 340 is V4, and they satisfy the relation: V3−V4=32.4.

In the second embodiment of the present optical photographing lens assembly, the distance on the optical axis between the second lens 320 and the third lens 330 is T23, the focal length of the optical photographing lens assembly is f, and they satisfy the relation: T23/f=0.61.

In the second embodiment of the present optical photographing lens assembly, the distance on the optical axis between the fourth lens 340 and the fifth lens 350 is T45, the focal length of the optical photographing lens assembly is f, and they satisfy the relation: (T45/f)*10=1.20.

In the second embodiment of the present optical photographing lens assembly, the radius of curvature of the object-side surface 321 of the second lens 320 is R3, the radius of curvature of the image-side surface 322 of the second lens 320 is R4, and they satisfy the relation: R3/R4=1.71.

In the second embodiment of the present optical photographing lens assembly, the radius of curvature of the object-side surface 331 of the third lens 330 is R5, the radius of curvature of the image-side surface 332 of the third lens 330 is R6, and they satisfy the relation: |R5/R6|=10.31.

In the second embodiment of the present optical photographing lens assembly, the focal length of the optical photographing lens assembly is f, the focal length of the first lens 310 is f1, and they satisfy the relation: f/f1=−0.30.

In the second embodiment of the present optical photographing lens assembly, the focal length of the optical photographing lens assembly is f, the focal length of the third lens 330 is f3, and they satisfy the relation: f/f3=0.92.

In the second embodiment of the present optical photographing lens assembly, the focal length of the fourth lens 340 is f4, the focal length of the fifth lens 350 is f5, and they satisfy the relation: f4/f5=−0.47.

In the second embodiment of the present optical photographing lens assembly, the focal length of the optical photographing lens assembly is f, the composite focal length of the first lens 310 and the second lens 320 is f12, and they satisfy the relation: f/f12=0.13.

In the second embodiment of the present optical photographing lens assembly, the number of the lenses with refractive power is N, and it satisfies the relation: N=5.

In the second embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.43, TTL/ImgH=4.79.

The detailed optical data of the second embodiment is shown in FIG. 17 (TABLE 3), and the aspheric surface data is shown in FIG. 18 (TABLE 4), wherein the units of the radius of curvature, the thickness and the focal length are expressed in mm, and HFOV is half of the maximal field of view.

Figure 5:
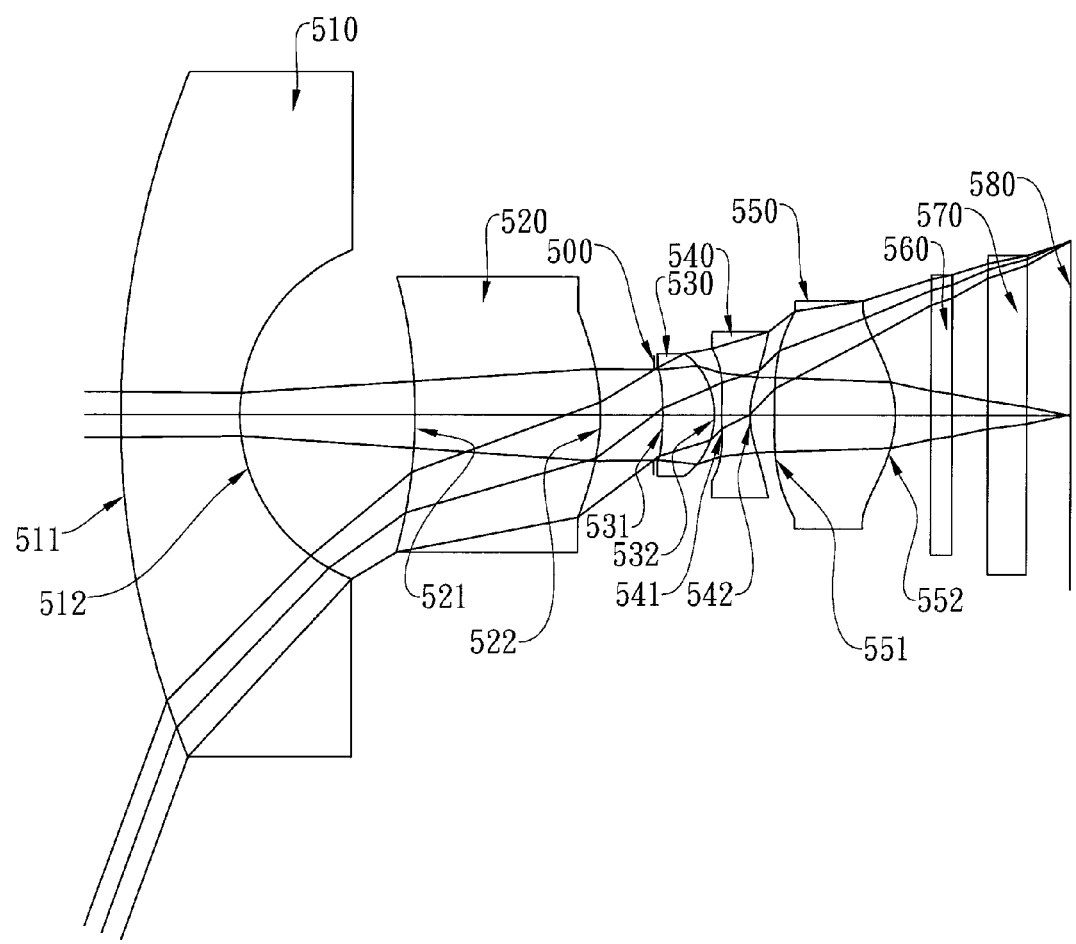
FIG. 5 shows an optical photographing lens assembly in accordance with a third embodiment of the present invention.
Figure 6:
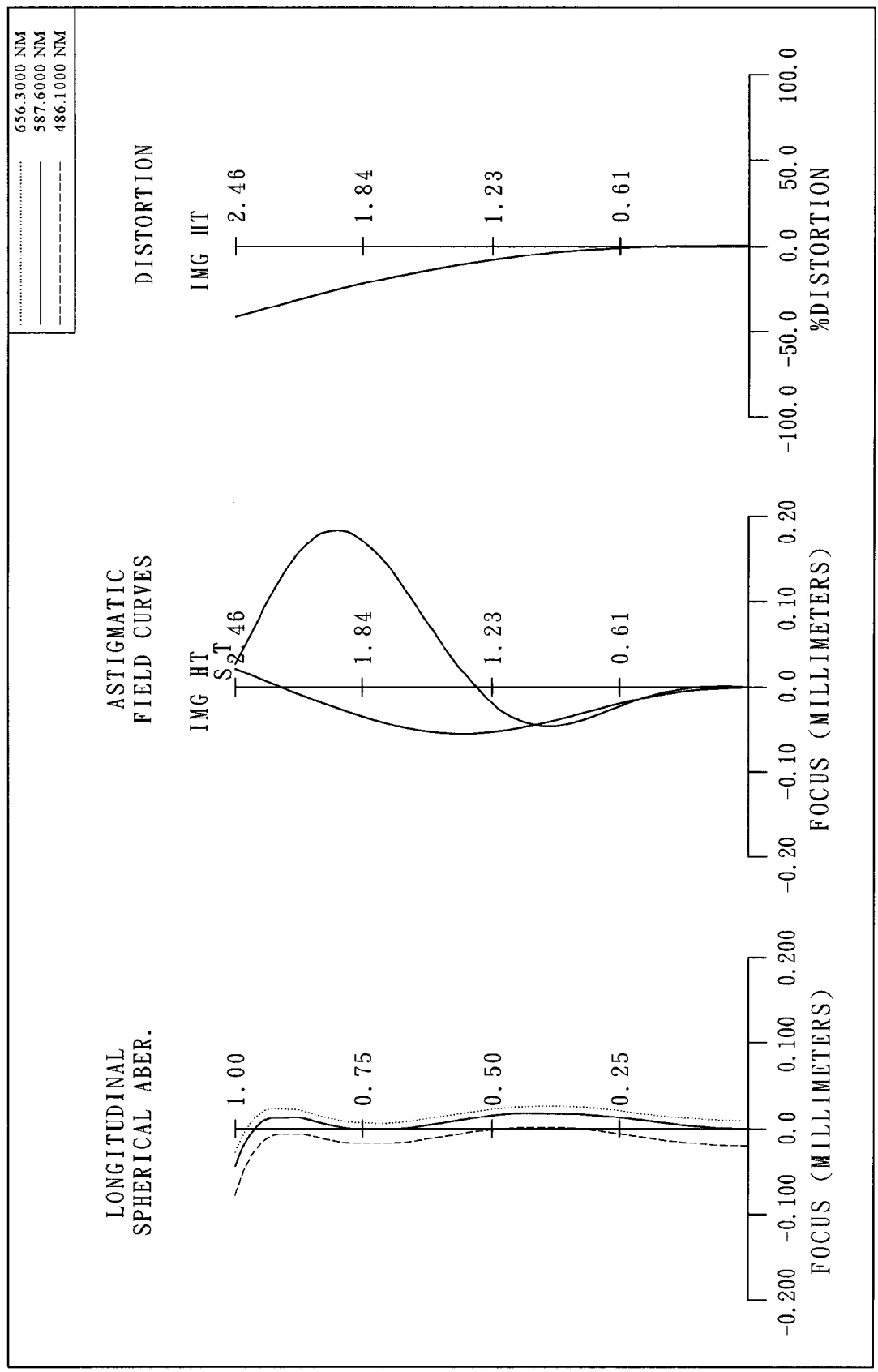
FIG. 6 shows the aberration curves of the third embodiment of the present invention.

FIG. 5 shows an optical photographing lens assembly in accordance with a third embodiment of the present invention, and FIG. 6 shows the aberration curves of the third embodiment of the present invention. The optical photographing lens assembly of the third embodiment of the present invention mainly comprises five lenses, in order from the object side to the image side: a glass first lens 510 with negative refractive power having a convex object-side surface 511 and a concave image-side surface 512; a plastic second lens 520 with positive refractive power having a concave object-side surface 521 and a convex image-side surface 522, the object-side and image-side surfaces 521 and 522 thereof being aspheric; a plastic third lens 530 with positive refractive power having a concave object-side surface 531 and a convex image-side surface 532, the object-side and image-side surfaces 531 and 532 thereof being aspheric; a plastic fourth lens 540 with negative refractive power having a convex object-side surface 541 and a concave image-side surface 542, the object-side and image-side surfaces 541 and 542 thereof being aspheric; and a plastic fifth lens 550 with positive refractive power having a convex object-side surface 551 and a convex image-side surface 552, the object-side and image-side surfaces 551 and 552 thereof being aspheric; wherein a stop 500 is disposed between the second lens 520 and the third lens 530; wherein an IR filter 560 and a cover glass 570 are sequentially disposed between the image-side surface 552 of the fifth lens 550 and an image plane 580; and wherein the IR filter 560 and the cover glass 570 are made of glass and have no influence on the focal length of the optical photographing lens assembly.

The equation of the aspheric surface profiles of the third embodiment has the same form as that of the first embodiment.

In the third embodiment of the present optical photographing lens assembly, the focal length of the optical photographing lens assembly is f, and it satisfies the relation: f=1.54 (mm).

In the third embodiment of the present optical photographing lens assembly, the f-number of the optical photographing lens assembly is Fno, and it satisfies the relation: Fno=2.40.

In the third embodiment of the present optical photographing lens assembly, half of the maximal field of view of the optical photographing lens assembly is HFOV, and it satisfies the relation: HFOV=69.9 deg.

In the third embodiment of the present optical photographing lens assembly, the Abbe number of the third lens 530 is V3, the Abbe number of the fourth lens 540 is V4, and they satisfy the relation: V3−V4=30.1.

In the third embodiment of the present optical photographing lens assembly, the distance on the optical axis between the second lens 520 and the third lens 530 is T23, the focal length of the optical photographing lens assembly is f, and they satisfy the relation: T23/f=0.57.

In the third embodiment of the present optical photographing lens assembly, the distance on the optical axis between the fourth lens 540 and the fifth lens 550 is T45, the focal length of the optical photographing lens assembly is f, and they satisfy the relation: (T45/f)*10=2.23.

In the third embodiment of the present optical photographing lens assembly, the radius of curvature of the object-side surface 521 of the second lens 520 is R3, the radius of curvature of the image-side surface 522 of the second lens 520 is R4, and they satisfy the relation: R3/R4=2.39.

In the third embodiment of the present optical photographing lens assembly, the radius of curvature of the object-side surface 531 of the third lens 530 is R5, the radius of curvature of the image-side surface 532 of the third lens 530 is R6, and they satisfy the relation: |R5/R6|=4.14.

In the third embodiment of the present optical photographing lens assembly, the focal length of the optical photographing lens assembly is f, the focal length of the first lens 510 is f1, and they satisfy the relation: f/f1=−0.34.

In the third embodiment of the present optical photographing lens assembly, the focal length of the optical photographing lens assembly is f, the focal length of the third lens 530 is f3, and they satisfy the relation: f/f3=0.62.

In the third embodiment of the present optical photographing lens assembly, the focal length of the fourth lens 540 is f4, the focal length of the fifth lens 550 is f5, and they satisfy the relation: f4/f5=−0.81.

In the third embodiment of the present optical photographing lens assembly, the focal length of the optical photographing lens assembly is f, the composite focal length of the first lens 510 and the second lens 520 is f12, and they satisfy the relation: f/f12=0.14.

In the third embodiment of the present optical photographing lens assembly, the number of the lenses with refractive power is N, and it satisfies the relation: N=5.

In the third embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.43, TTL/ImgH=5.30.

The detailed optical data of the third embodiment is shown in FIG. 19 (TABLE 5), and the aspheric surface data is shown in FIG. 20 (TABLE 6), wherein the units of the radius of curvature, the thickness and the focal length are expressed in mm, and HFOV is half of the maximal field of view.

Figure 7:
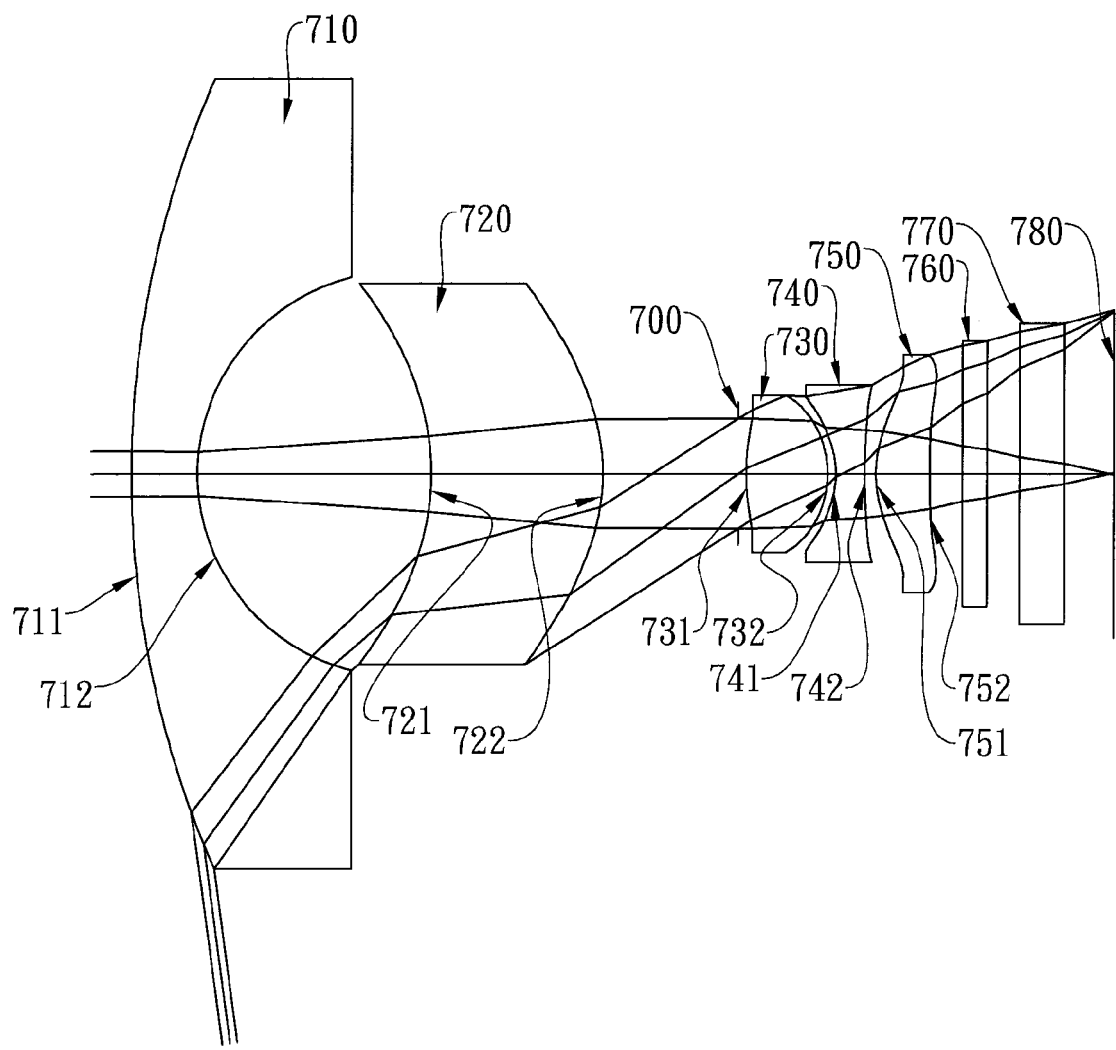
FIG. 7 shows an optical photographing lens assembly in accordance with a fourth embodiment of the present invention.
Figure 8:
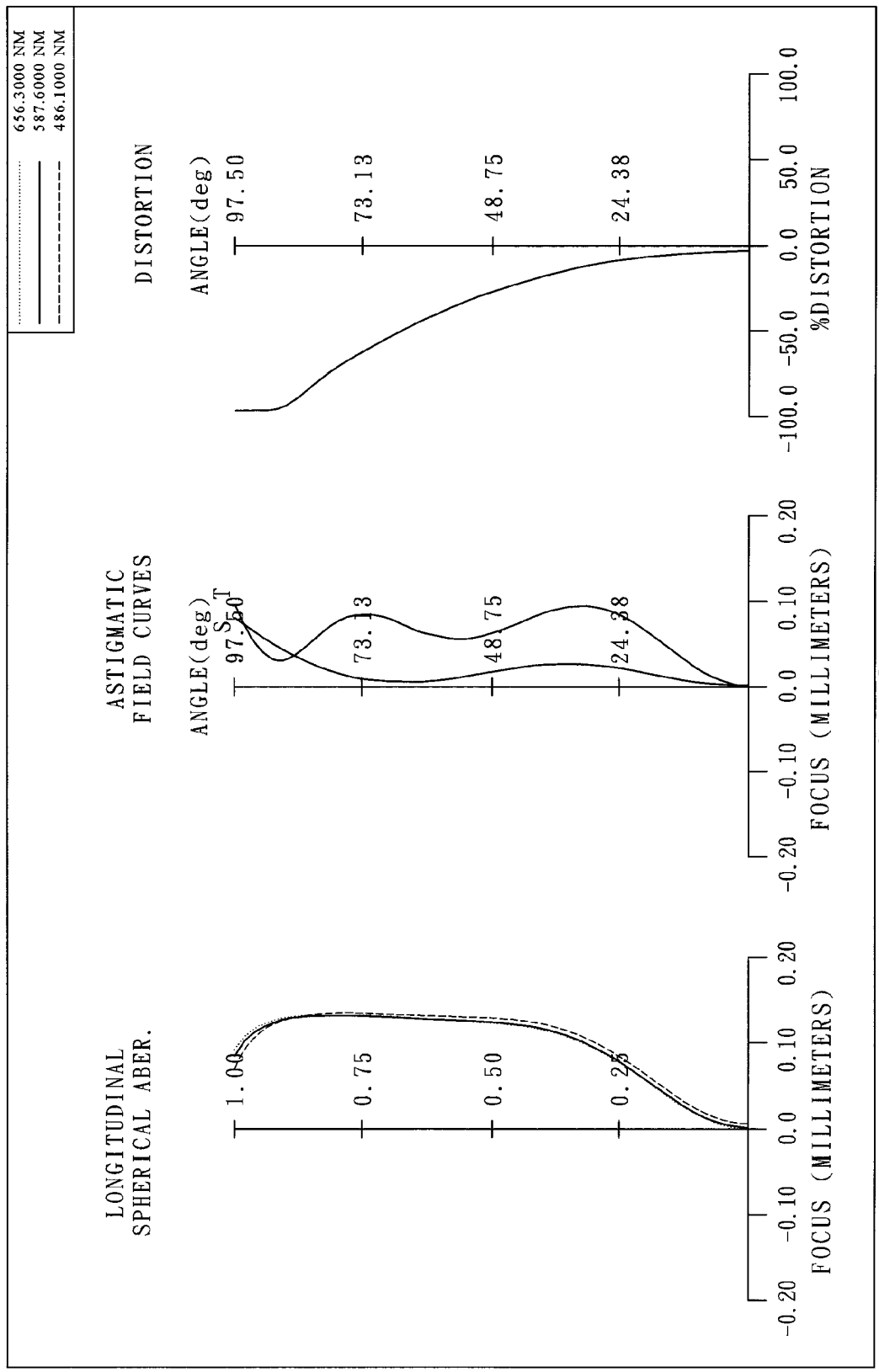
FIG. 8 shows the aberration curves of the fourth embodiment of the present invention.

FIG. 7 shows an optical photographing lens assembly in accordance with a fourth embodiment of the present invention, and FIG. 8 shows the aberration curves of the fourth embodiment of the present invention. The optical photographing lens assembly of the fourth embodiment of the present invention mainly comprises five lenses, in order from the object side to the image side: a glass first lens 710 with negative refractive power having a convex object-side surface 711 and a concave image-side surface 712; a plastic second lens 720 with positive refractive power having a concave object-side surface 721 and a convex image-side surface 722, the object-side and image-side surfaces 721 and 722 thereof being aspheric; a plastic third lens 730 with positive refractive power having a convex object-side surface 731 and a convex image-side surface 732, the object-side and image-side surfaces 731 and 732 thereof being aspheric; a plastic fourth lens 740 with negative refractive power having a concave object-side surface 741 and a concave image-side surface 742, the object-side and image-side surfaces 741 and 742 thereof being aspheric; and a plastic fifth lens 750 with positive refractive power having a convex object-side surface 751 and a concave image-side surface 752, the object-side and image-side surfaces 751 and 752 thereof being aspheric; wherein a stop 700 is disposed between the second lens 720 and the third lens 730; wherein an IR filter 760 and a cover glass 770 are sequentially disposed between the image-side surface 752 of the fifth lens 750 and an image plane 780; and wherein the IR filter 760 and the cover glass 770 are made of glass and have no influence on the focal length of the optical photographing lens assembly.

The equation of the aspheric surface profiles of the fourth embodiment has the same form as that of the first embodiment.

In the fourth embodiment of the present optical photographing lens assembly, the focal length of the optical photographing lens assembly is f, and it satisfies the relation: f=1.34 (mm).

In the fourth embodiment of the present optical photographing lens assembly, the f-number of the optical photographing lens assembly is Fno, and it satisfies the relation: Fno=2.40.

In the fourth embodiment of the present optical photographing lens assembly, half of the maximal field of view of the optical photographing lens assembly is HFOV, and it satisfies the relation: HFOV=97.5 deg.

In the fourth embodiment of the present optical photographing lens assembly, the Abbe number of the third lens 730 is V3, the Abbe number of the fourth lens 740 is V4, and they satisfy the relation: V3−V4=31.1.

In the fourth embodiment of the present optical photographing lens assembly, the distance on the optical axis between the second lens 720 and the third lens 730 is T23, the focal length of the optical photographing lens assembly is f, and they satisfy the relation: T23/f=1.31.

In the fourth embodiment of the present optical photographing lens assembly, the distance on the optical axis between the fourth lens 740 and the fifth lens 750 is T45, the focal length of the optical photographing lens assembly is f, and they satisfy the relation: (T45/f)*10=1.04.

In the fourth embodiment of the present optical photographing lens assembly, the radius of curvature of the object-side surface 721 of the second lens 720 is R3, the radius of curvature of the image-side surface 722 of the second lens 720 is R4, and they satisfy the relation: R3/R4=1.27.

In the fourth embodiment of the present optical photographing lens assembly, the radius of curvature of the object-side surface 731 of the third lens 730 is R5, the radius of curvature of the image-side surface 732 of the third lens 730 is R6, and they satisfy the relation: |R5/R6|=2.47.

In the fourth embodiment of the present optical photographing lens assembly, the focal length of the optical photographing lens assembly is f, the focal length of the first lens 710 is f1, and they satisfy the relation: f/f1=−0.33.

In the fourth embodiment of the present optical photographing lens assembly, the focal length of the optical photographing lens assembly is f, the focal length of the third lens 730 is f3, and they satisfy the relation: f/f3=0.79.

In the fourth embodiment of the present optical photographing lens assembly, the focal length of the fourth lens 740 is f4, the focal length of the fifth lens 750 is f5, and they satisfy the relation: f4/f5=−0.50.

In the fourth embodiment of the present optical photographing lens assembly, the focal length of the optical photographing lens assembly is f, the composite focal length of the first lens 710 and the second lens 720 is f12, and they satisfy the relation: f/f12=0.03.

In the fourth embodiment of the present optical photographing lens assembly, the number of the lenses with refractive power is N, and it satisfies the relation: N=5.

In the fourth embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.37, TTL/ImgH=5.87.

The detailed optical data of the fourth embodiment is shown in FIG. 21 (TABLE 7), and the aspheric surface data is shown in FIG. 22 (TABLE 8), wherein the units of the radius of curvature, the thickness and the focal length are expressed in mm, and HFOV is half of the maximal field of view.

Figure 9:
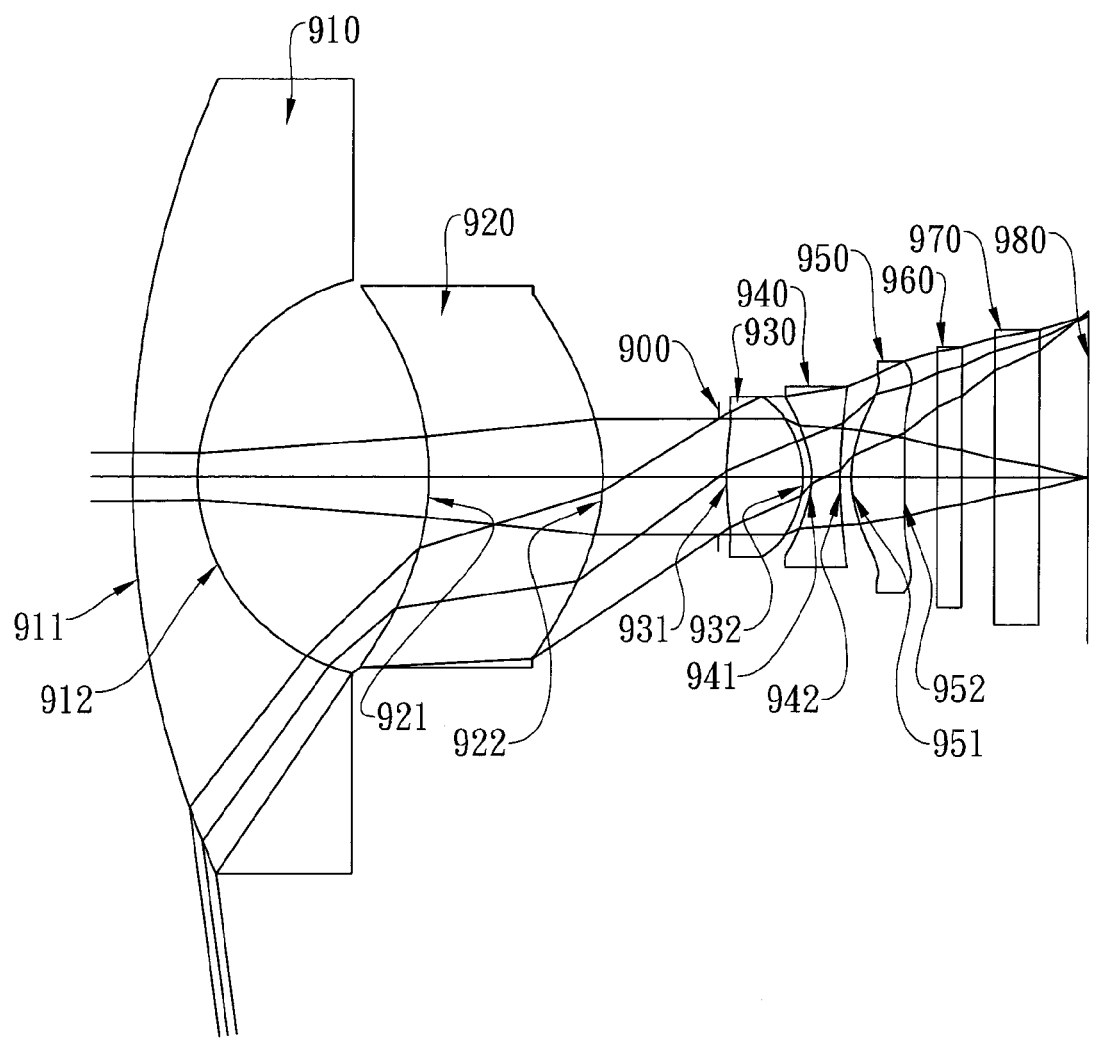
FIG. 9 shows an optical photographing lens assembly in accordance with a fifth embodiment of the present invention.
Figure 10:
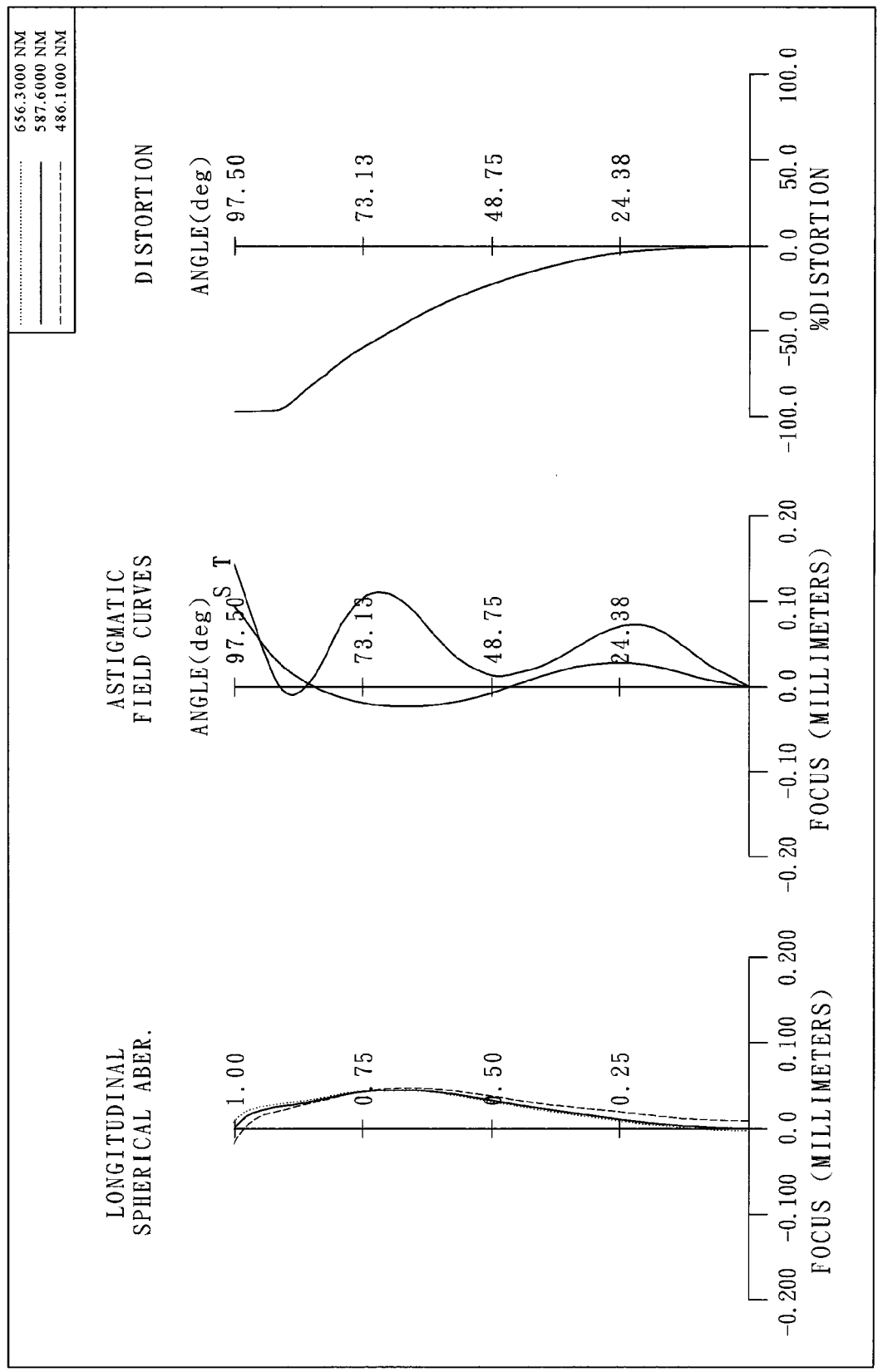
FIG. 10 shows the aberration curves of the fifth embodiment of the present invention.

FIG. 9 shows an optical photographing lens assembly in accordance with a fifth embodiment of the present invention, and FIG. 10 shows the aberration curves of the fifth embodiment of the present invention. The optical photographing lens assembly of the fifth embodiment of the present invention mainly comprises five lenses, in order from the object side to the image side: a glass first lens 910 with negative refractive power having a convex object-side surface 911 and a concave image-side surface 912; a plastic second lens 920 with positive refractive power having a concave object-side surface 921 and a convex image-side surface 922, the object-side and image-side surfaces 921 and 922 thereof being aspheric; a plastic third lens 930 with positive refractive power having a convex object-side surface 931 and a convex image-side surface 932, the object-side and image-side surfaces 931 and 932 thereof being aspheric; a plastic fourth lens 940 with negative refractive power having a concave object-side surface 941 and a concave image-side surface 942, the object-side and image-side surfaces 941 and 942 thereof being aspheric; and a plastic fifth lens 950 with positive refractive power having a convex object-side surface 951 and a convex image-side surface 952, the object-side and image-side surfaces 951 and 952 thereof being aspheric; wherein a stop 900 is disposed between the second lens 920 and the third lens 930; wherein an IR filter 960 and a cover glass 970 are sequentially disposed between the image-side surface 952 of the fifth lens 950 and an image plane 980; and wherein the IR filter 960 and the cover glass 970 are made of glass and have no influence on the focal length of the optical photographing lens assembly.

The equation of the aspheric surface profiles of the fifth embodiment has the same form as that of the first embodiment.

In the fifth embodiment of the present optical photographing lens assembly, the focal length of the optical photographing lens assembly is f, and it satisfies the relation: f=1.20 (mm).

In the fifth embodiment of the present optical photographing lens assembly, the f-number of the optical photographing lens assembly is Fno, and it satisfies the relation: Fno=2.01.

In the fifth embodiment of the present optical photographing lens assembly, half of the maximal field of view of the optical photographing lens assembly is HFOV, and it satisfies the relation: HFOV=97.5 deg.

In the fifth embodiment of the present optical photographing lens assembly, the Abbe number of the third lens 930 is V3, the Abbe number of the fourth lens 940 is V4, and they satisfy the relation: V3−V4=31.1.

In the fifth embodiment of the present optical photographing lens assembly, the distance on the optical axis between the second lens 920 and the third lens 930 is T23, the focal length of the optical photographing lens assembly is f, and they satisfy the relation: T23/f=1.28.

In the fifth embodiment of the present optical photographing lens assembly, the distance on the optical axis between the fourth lens 940 and the fifth lens 950 is T45, the focal length of the optical photographing lens assembly is f, and they satisfy the relation: (T45/f)*10=1.18.

In the fifth embodiment of the present optical photographing lens assembly, the radius of curvature of the object-side surface 921 of the second lens 920 is R3, the radius of curvature of the image-side surface 922 of the second lens 920 is R4, and they satisfy the relation: R3/R4=1.31.

In the fifth embodiment of the present optical photographing lens assembly, the radius of curvature of the object-side surface 931 of the third lens 930 is R5, the radius of curvature of the image-side surface 932 of the third lens 930 is R6, and they satisfy the relation: |R5/R6|=3.64.

In the fifth embodiment of the present optical photographing lens assembly, the focal length of the optical photographing lens assembly is f, the focal length of the first lens 910 is f1, and they satisfy the relation: f/f1=−0.30.

In the fifth embodiment of the present optical photographing lens assembly, the focal length of the optical photographing lens assembly is f, the focal length of the third lens 930 is f3, and they satisfy the relation: f/f3=0.71.

In the fifth embodiment of the present optical photographing lens assembly, the focal length of the fourth lens 940 is f4, the focal length of the fifth lens 950 is f5, and they satisfy the relation: f4/f5=−0.58.

In the fifth embodiment of the present optical photographing lens assembly, the focal length of the optical photographing lens assembly is f, the composite focal length of the first lens 910 and the second lens 920 is f12, and they satisfy the relation: f/f12=0.05.

In the fifth embodiment of the present optical photographing lens assembly, the number of the lenses with refractive power is N, and it satisfies the relation: N=5.

In the fifth embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.37, TTL/ImgH=5.74.

The detailed optical data of the fifth embodiment is shown in FIG. 23 (TABLE 9), and the aspheric surface data is shown in FIG. 24 (TABLE 10), wherein the units of the radius of curvature, the thickness and the focal length are expressed in mm, and HFOV is half of the maximal field of view.

Figure 11:
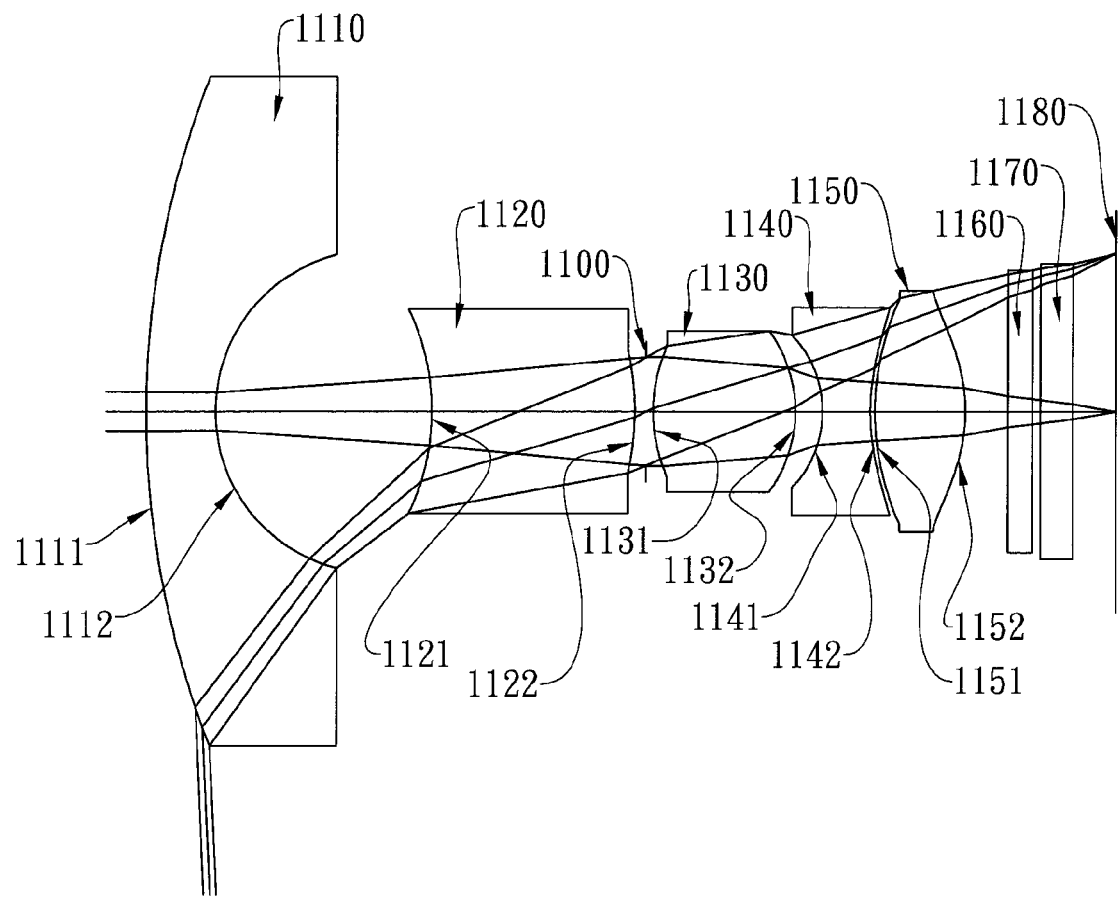
FIG. 11 shows an optical photographing lens assembly in accordance with a sixth embodiment of the present invention.
Figure 12:
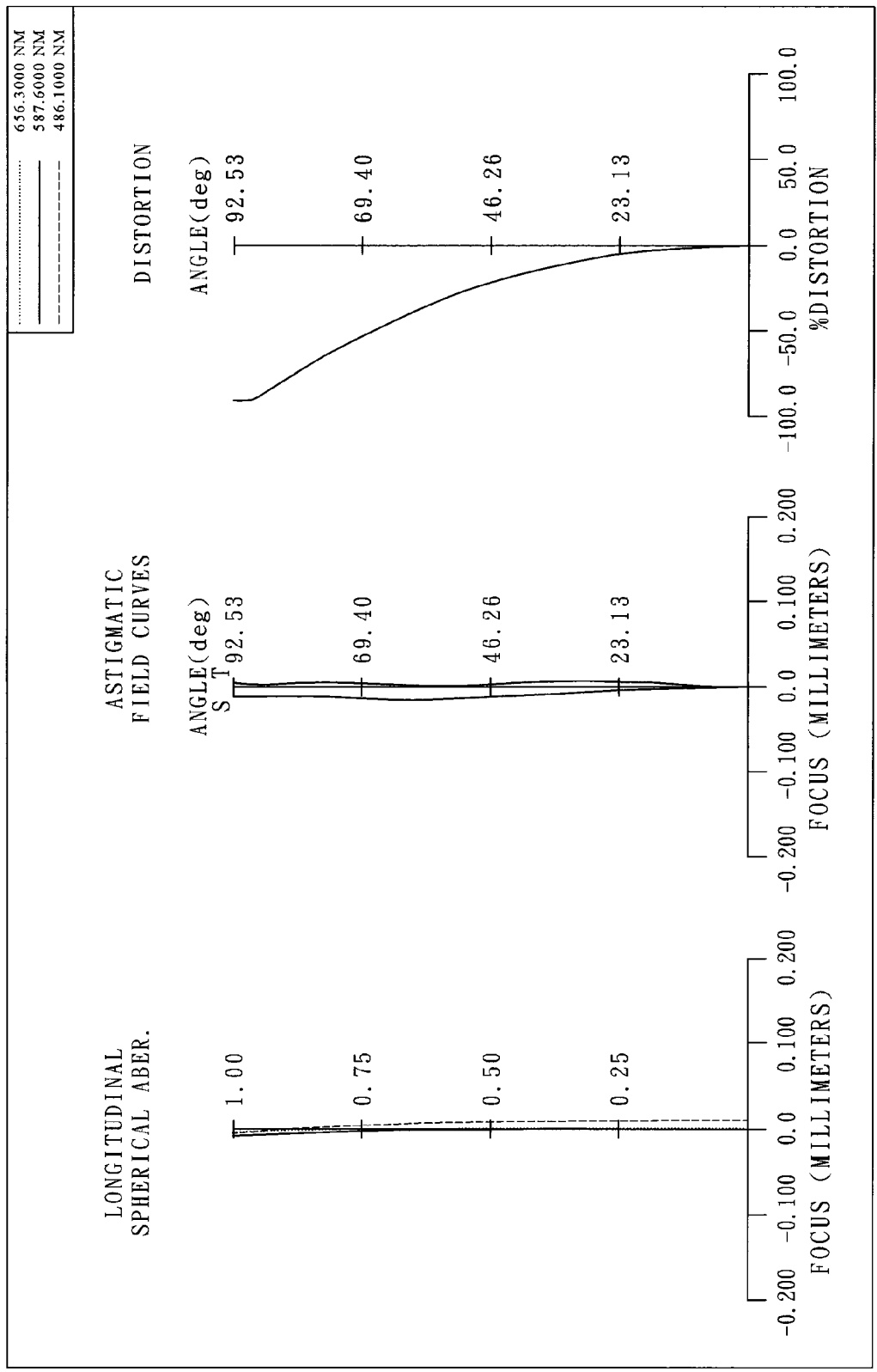
FIG. 12 shows the aberration curves of the sixth embodiment of the present invention.

FIG. 11 shows an optical photographing lens assembly in accordance with a sixth embodiment of the present invention, and FIG. 12 shows the aberration curves of the sixth embodiment of the present invention. The optical photographing lens assembly of the sixth embodiment of the present invention mainly comprises five lenses, in order from the object side to the image side: a glass first lens 1110 with negative refractive power having a convex object-side surface 1111 and a concave image-side surface 1112; a plastic second lens 1120 with positive refractive power having a concave object-side surface 1121 and a convex image-side surface 1122, the object-side and image-side surfaces 1121 and 1122 thereof being aspheric; a plastic third lens 1130 with positive refractive power having a convex object-side surface 1131 and a convex image-side surface 1132, the object-side and image-side surfaces 1131 and 1132 thereof being aspheric; a plastic fourth lens 1140 with negative refractive power having a concave object-side surface 1141 and a concave image-side surface 1142, the object-side and image-side surfaces 1141 and 1142 thereof being aspheric; and a plastic fifth lens 1150 with positive refractive power having a convex object-side surface 1151 and a convex image-side surface 1152, the object-side and image-side surfaces 1151 and 1152 thereof being aspheric; wherein a stop 1100 is disposed between the second lens 1120 and the third lens 1130; wherein an IR filter 1160 and a cover glass 1170 are sequentially disposed between the image-side surface 1152 of the fifth lens 1150 and an image plane 1180; and wherein the IR filter 1160 and the cover glass 1170 are made of glass and have no influence on the focal length of the optical photographing lens assembly.

The equation of the aspheric surface profiles of the sixth embodiment has the same form as that of the first embodiment.

In the sixth embodiment of the present optical photographing lens assembly, the focal length of the optical photographing lens assembly is f, and it satisfies the relation: f=1.38 (mm).

In the sixth embodiment of the present optical photographing lens assembly, the f-number of the optical photographing lens assembly is Fno, and it satisfies the relation: Fno=2.84.

In the sixth embodiment of the present optical photographing lens assembly, half of the maximal field of view of the optical photographing lens assembly is HFOV, and it satisfies the relation: HFOV=92.5 deg.

In the sixth embodiment of the present optical photographing lens assembly, the Abbe number of the third lens 1130 is V3, the Abbe number of the fourth lens 1140 is V4, and they satisfy the relation: V3−V4=32.4.

In the sixth embodiment of the present optical photographing lens assembly, the distance on the optical axis between the second lens 1120 and the third lens 1130 is T23, the focal length of the optical photographing lens assembly is f, and they satisfy the relation: T23/f=0.17.

In the sixth embodiment of the present optical photographing lens assembly, the distance on the optical axis between the fourth lens 1140 and the fifth lens 1150 is T45, the focal length of the optical photographing lens assembly is f, and they satisfy the relation: (T45/f)*10=0.40.

In the sixth embodiment of the present optical photographing lens assembly, the radius of curvature of the object-side surface 1121 of the second lens 1120 is R3, the radius of curvature of the image-side surface 1122 of the second lens 1120 is R4, and they satisfy the relation: R3/R4=0.88.

In the sixth embodiment of the present optical photographing lens assembly, the radius of curvature of the object-side surface 1131 of the third lens 1130 is R5, the radius of curvature of the image-side surface 1132 of the third lens 1130 is R6, and they satisfy the relation: |R5/R6|=1.33.

In the sixth embodiment of the present optical photographing lens assembly, the focal length of the optical photographing lens assembly is f, the focal length of the first lens 1110 is f1, and they satisfy the relation: f/f1=−0.40.

In the sixth embodiment of the present optical photographing lens assembly, the focal length of the optical photographing lens assembly is f, the focal length of the third lens 1130 is f3, and they satisfy the relation: f/f3=0.70.

In the sixth embodiment of the present optical photographing lens assembly, the focal length of the fourth lens 1140 is f4, the focal length of the fifth lens 1150 is f5, and they satisfy the relation: f4/f5=−0.53.

In the sixth embodiment of the present optical photographing lens assembly, the focal length of the optical photographing lens assembly is f, the composite focal length of the first lens 1110 and the second lens 1120 is f12, and they satisfy the relation: f/f12=−0.24.

In the sixth embodiment of the present optical photographing lens assembly, the number of the lenses with refractive power is N, and it satisfies the relation: N=5.

In the sixth embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.48, TTL/ImgH=5.98.

The detailed optical data of the sixth embodiment is shown in FIG. 25 (TABLE 11), and the aspheric surface data is shown in FIG. 26 (TABLE 12), wherein the units of the radius of curvature, the thickness and the focal length are expressed in mm, and HFOV is half of the maximal field of view.

Figure 13:
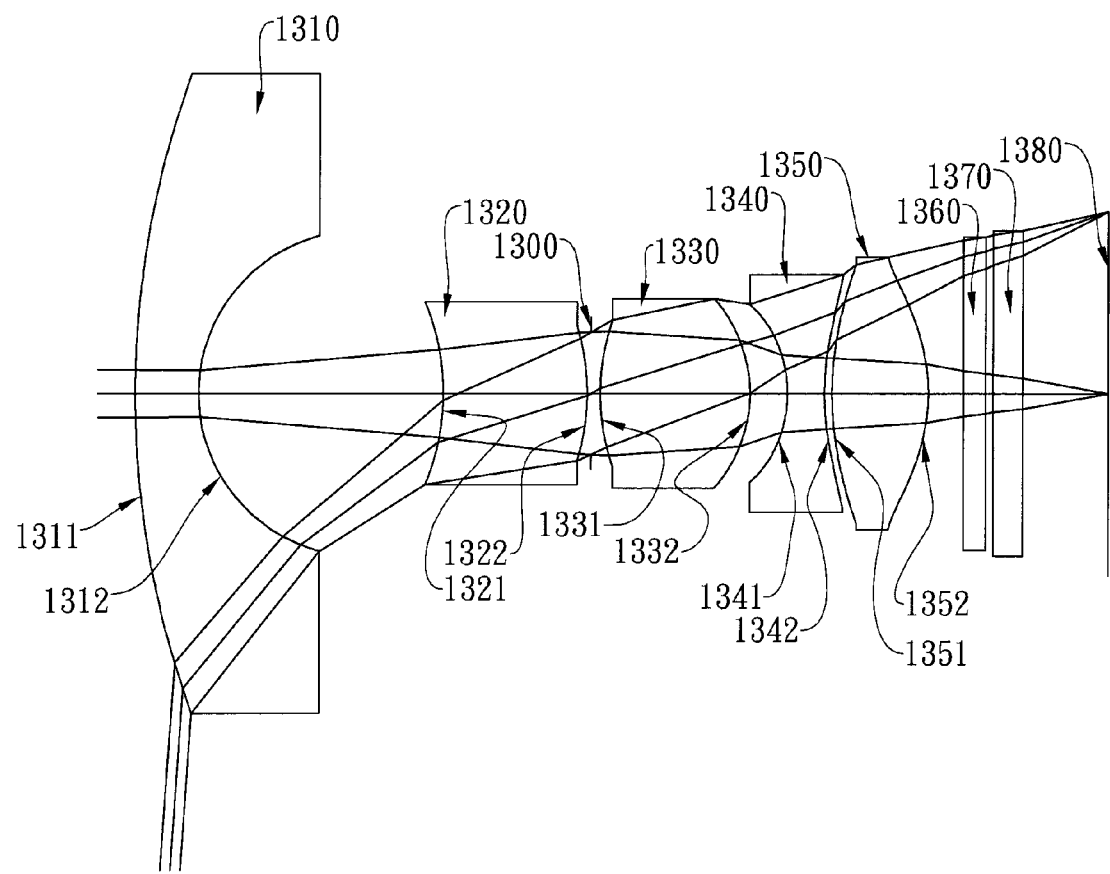
FIG. 13 shows an optical photographing lens assembly in accordance with a seventh embodiment of the present invention.
Figure 14:
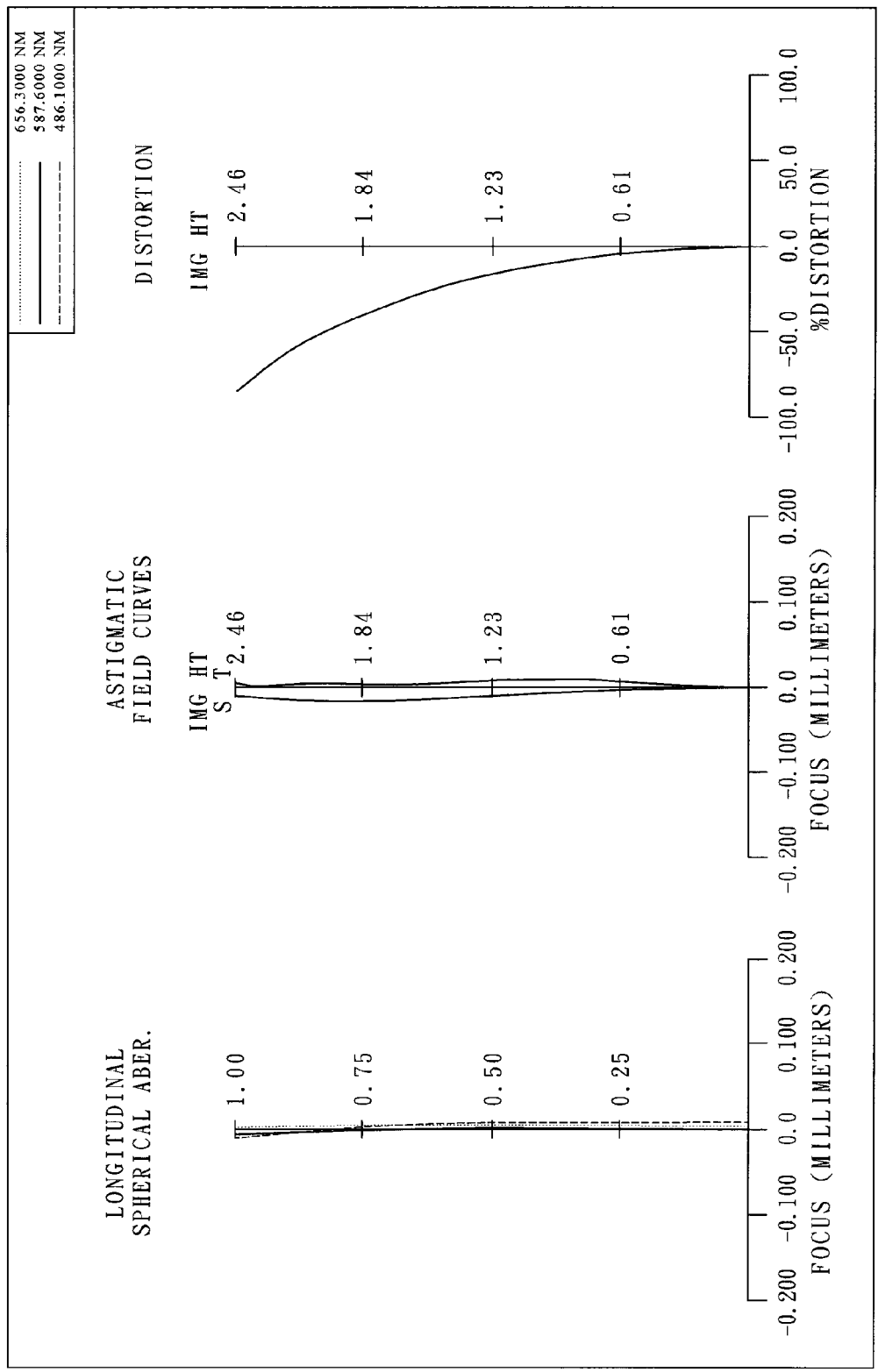
FIG. 14 shows the aberration curves of the seventh embodiment of the present invention.

FIG. 13 shows an optical photographing lens assembly in accordance with a seventh embodiment of the present invention, and FIG. 14 shows the aberration curves of the seventh embodiment of the present invention. The optical photographing lens assembly of the seventh embodiment of the present invention mainly comprises five lenses, in order from the object side to the image side: a glass first lens 1310 with negative refractive power having a convex object-side surface 1311 and a concave image-side surface 1312; a plastic second lens 1320 with positive refractive power having a concave object-side surface 1321 and a convex image-side surface 1322, the object-side and image-side surfaces 1321 and 1322 thereof being aspheric; a plastic third lens 1330 with positive refractive power having a convex object-side surface 1331 and a convex image-side surface 1332, the object-side and image-side surfaces 1331 and 1332 thereof being aspheric; a plastic fourth lens 1340 with negative refractive power having a concave object-side surface 1341 and a concave image-side surface 1342, the object-side and image-side surfaces 1341 and 1342 thereof being aspheric; and a plastic fifth lens 1350 with positive refractive power having a convex object-side surface 1351 and a convex image-side surface 1352, the object-side and image-side surfaces 1351 and 1352 thereof being aspheric; wherein a stop 1300 is disposed between the second lens 1320 and the third lens 1330; wherein an IR filter 1360 and a cover glass 1370 are sequentially disposed between the image-side surface 1352 of the fifth lens 1350 and an image plane 1380; and wherein the IR filter 1360 and the cover glass 1370 are made of glass and have no influence on the focal length of the optical photographing lens assembly.

The equation of the aspheric surface profiles of the seventh embodiment has the same form as that of the first embodiment.

In the seventh embodiment of the present optical photographing lens assembly, the focal length of the optical photographing lens assembly is f, and it satisfies the relation: f=1.82 (mm).

In the seventh embodiment of the present optical photographing lens assembly, the f-number of the optical photographing lens assembly is Fno, and it satisfies the relation: Fno=2.82.

In the seventh embodiment of the present optical photographing lens assembly, half of the maximal field of view of the optical photographing lens assembly is HFOV, and it satisfies the relation: HFOV=85.9 deg.

In the seventh embodiment of the present optical photographing lens assembly, the Abbe number of the third lens 1330 is V3, the Abbe number of the fourth lens 1340 is V4, and they satisfy the relation: V3−V4=32.4.

In the seventh embodiment of the present optical photographing lens assembly, the distance on the optical axis between the second lens 1320 and the third lens 1330 is T23, the focal length of the optical photographing lens assembly is f, and they satisfy the relation: T23/f=0.10.

In the seventh embodiment of the present optical photographing lens assembly, the distance on the optical axis between the fourth lens 1340 and the fifth lens 1350 is T45, the focal length of the optical photographing lens assembly is f, and they satisfy the relation: (T45/f)*10=0.55.

In the seventh embodiment of the present optical photographing lens assembly, the radius of curvature of the object-side surface 1321 of the second lens 1320 is R3, the radius of curvature of the image-side surface 1322 of the second lens 1320 is R4, and they satisfy the relation: R3/R4=1.17.

In the seventh embodiment of the present optical photographing lens assembly, the radius of curvature of the object-side surface 1331 of the third lens 1330 is R5, the radius of curvature of the image-side surface 1332 of the third lens 1330 is R6, and they satisfy the relation: |R5/R6|=1.68.

In the seventh embodiment of the present optical photographing lens assembly, the focal length of the optical photographing lens assembly is f, the focal length of the first lens 1310 is f1, and they satisfy the relation: f/f1=−0.48.

In the seventh embodiment of the present optical photographing lens assembly, the focal length of the optical photographing lens assembly is f, the focal length of the third lens 1330 is f3, and they satisfy the relation: f/f3=0.73.

In the seventh embodiment of the present optical photographing lens assembly, the focal length of the fourth lens 1340 is f4, the focal length of the fifth lens 1350 is f5, and they satisfy the relation: f4/f5=−0.54.

In the seventh embodiment of the present optical photographing lens assembly, the focal length of the optical photographing lens assembly is f, the composite focal length of the first lens 1310 and the second lens 1320 is f12, and they satisfy the relation: f/f12=−0.16.

In the seventh embodiment of the present optical photographing lens assembly, the number of the lenses with refractive power is N, and it satisfies the relation: N=5.

In the seventh embodiment of the present optical photographing lens assembly, the optical photographing lens assembly further comprises an electronic sensor on which an object is imaged. The distance on the optical axis between the stop and the electronic sensor is SL, the distance on the optical axis between the object-side surface of the first lens and the electronic sensor is TTL, half of the diagonal length of the effective pixel area of the electronic sensor is ImgH, and they satisfy the relations: SL/TTL=0.52, TTL/ImgH=5.23.

The detailed optical data of the seventh embodiment is shown in FIG. 27 (TABLE 13), and the aspheric surface data is shown in FIG. 28 (TABLE 14), wherein the units of the radius of curvature, the thickness and the focal length are expressed in mm, and HFOV is half of the maximal field of view.

It is to be noted that TABLES 1-14 (illustrated in FIGS. 15-28 respectively) show different data of the different embodiments, however, the data of the different embodiments are obtained from experiments. Therefore, any optical photographing lens assembly of the same structure is considered to be within the scope of the present invention even if it uses different data. The embodiments depicted above and the appended drawings are exemplary and are not intended to limit the claim scope of the present invention. TABLE 15 (illustrated in FIG. 29) shows the data of the respective embodiments resulting from the equations.

What is claimed is:

1. An optical photographing lens assembly comprising, in order from an object side to an image side:
   a first lens with negative refractive power having a concave image-side surface;
   a second lens with positive refractive power having a concave object-side surface and a convex image-side surface;
   a third lens with positive refractive power having a concave object-side surface and a convex image-side surface;
   a fourth lens with negative refractive power; and
   a fifth lens with positive refractive power; wherein a stop is disposed between the second and third lenses; wherein at least two of the third, fourth and fifth lenses are configured to each have at least one aspheric surface; and wherein a distance on the optical axis between the fourth and fifth lenses is T45, a focal length of the optical photographing lens assembly is f, the number of the lenses with refractive power is N, and they satisfy the relations: $0.10 < (T45/f)*10 < 6.00$, $5 \leq N \leq 6$.

2. The optical photographing lens assembly according to claim 1, wherein the first lens has a convex object-side surface, and wherein the fifth lens is made of plastic material and the object-side and image-side surfaces thereof are aspheric.

3. The optical photographing lens assembly according to claim 2, wherein the number of the lenses with refractive power is N, and it satisfies the relation: $N=5$.

4. The optical photographing lens assembly according to claim 3, wherein the fourth lens has a convex object-side surface and a concave image-side surface and is made of plastic material.

5. The optical photographing lens assembly according to claim 3, wherein the focal length of the optical photographing lens assembly is f, a focal length of the third lens is f3, and they satisfy the relation: $0.50 < f/f3 < 1.40$.

6. The optical photographing lens assembly according to claim 3, wherein the focal length of the optical photographing lens assembly is f, the focal length of the third lens is f3, and they satisfy the relation: $0.65 < f/f3 < 1.00$.

7. The optical photographing lens assembly according to claim 5, wherein the distance on the optical axis between the fourth and fifth lenses is T45, the focal length of the optical photographing lens assembly is f, and they satisfy the relation: $0.70 < (T45/f)*10 < 3.00$.

8. The optical photographing lens assembly according to claim 7, wherein a focal length of the fourth lens is f4, a focal length of the fifth lens is f5, and they satisfy the relation: $-1.0 < f4/f5 < -0.4$.

9. The optical photographing lens assembly according to claim 1 further comprising an electronic sensor on which an object is imaged, wherein a distance on the optical axis between the stop and the electronic sensor is SL, a distance on the optical axis between the object-side surface of the first lens and the electronic sensor is TTL, and they satisfy the relation: $0.30 < SL/TTL < 0.55$.

10. The optical photographing lens assembly according to claim 9, wherein a radius of curvature of the object-side surface of the third lens is R5, a radius of curvature of the image-side surface of the third lens is R6, and they satisfy the relation: $1.25 < |R5/R6|$.

11. The optical photographing lens assembly according to claim 2, wherein the focal length of the optical photographing lens assembly is f, a focal length of the first lens is f1, and they satisfy the relation: $-0.40 < f/f1 < -0.25$.

12. The optical photographing lens assembly according to claim 3, wherein the focal length of the optical photographing lens assembly is f, a composite focal length of the first and second lenses is f12, and they satisfy the relation: $0.08 < f/f12 < 0.30$.

13. The optical photographing lens assembly according to claim 4, wherein a radius of curvature of the object-side surface of the second lens is R3, a radius of curvature of the image-side surface of the second lens is R4, and they satisfy the relation: $1.2 < R3/R4 < 4.5$.

14. The optical photographing lens assembly according to claim 2, wherein an Abbe number of the third lens is V3, an Abbe number of the fourth lens is V4, and they satisfy the relation: $23.0 < V3-V4 < 38.0$.

15. The optical photographing lens assembly according to claim 1 further comprising an electronic sensor on which an object is imaged, wherein the distance on the optical axis between the object-side surface of the first lens and the electronic sensor is TTL, half of the diagonal length of the effective pixel area of the electronic sensor is ImgH, and they satisfy the relation: $TTL/ImgH < 6.0$.

16. An optical photographing lens assembly comprising five lenses with refractive power, in order from an object side to an image side:
   a first lens with negative refractive power having a convex object-side surface and a concave image-side surface;
   a second lens with positive refractive power having a concave object-side surface and a convex image-side surface;
   a third lens with positive refractive power;
   a fourth lens with negative refractive power, the object-side and image-side surfaces thereof being aspheric; and
   a fifth lens with positive refractive power, the object-side and image-side surfaces thereof being aspheric; wherein a distance on the optical axis between the second and third lenses is T23, a distance on the optical axis between the fourth and fifth lenses is T45, a focal length of the optical photographing lens assembly is f, a radius of curvature of the object-side surface of the third lens is R5, a radius of curvature of the image-side surface of the third lens is R6, a focal length of the third lens is f3, and they satisfy the relations: $0.00 < T23/f < 1.50$, $0.10 < (T45/f)*10 < 6.00$, $1.25 < |R5/R6|$, $0.50 < f/f3 < 1.40$.

17. The optical photographing lens assembly according to claim 16, wherein the fifth lens is made of plastic material.

18. The optical photographing lens assembly according to claim 17, wherein an Abbe number of the third lens is V3, an Abbe number of the fourth lens is V4, and they satisfy the relation: $23.0 < V3-V4 < 38.0$; and wherein the optical photographing lens assembly further comprises a stop disposed between the second and third lenses.

19. The optical photographing lens assembly according to claim 18, wherein the focal length of the optical photographing lens assembly is f, the focal length of the third lens is f3, and they satisfy the relation: $0.65 < f/f3 < 1.00$.

20. The optical photographing lens assembly according to claim 19, wherein the distance on the optical axis between the fourth and fifth lenses is T45, the focal length of the optical photographing lens assembly is f, and they satisfy the relation: $0.70<(T45/f)*10<3.00$.

21. The optical photographing lens assembly according to claim 16, wherein a focal length of the fourth lens is f4, a focal length of the fifth lens is f5, a radius of curvature of the object-side surface of the second lens is R3, a radius of curvature of the image-side surface of the second lens is R4, and they satisfy the relations: $-1.0<f4/f5<-0.4$, $1.2<R3/R4<4.5$.

22. An optical photographing lens assembly comprising five lenses with refractive power, in order from an object side to an image side:
   a first lens with negative refractive power having a concave image-side surface;
   a second lens with positive refractive power having a concave object-side surface and a convex image-side surface;
   a third lens with positive refractive power;
   a fourth lens with negative refractive power; and
   a fifth lens with positive refractive power; wherein the third, fourth and fifth lenses are meniscus lenses.

23. The optical photographing lens assembly according to claim 22, wherein at least two of the third, fourth and fifth lenses are configured to each have at least one aspheric surface.

24. The optical photographing lens assembly according to claim 23, wherein a focal length of the optical photographing lens assembly is f, a focal length of the third lens is f3, a radius of curvature of the object-side surface of the third lens is R5, a radius of curvature of the image-side surface of the third lens is R6, and they satisfy the relations: $0.65<f/f3<1.00$, $1.25<|R5/R6|$.

25. The optical photographing lens assembly according to claim 23, wherein an Abbe number of the third lens is V3, an Abbe number of the fourth lens is V4, and they satisfy the relation: $23.0<V3-V4<38.0$; and wherein the optical photographing lens assembly further comprises a stop disposed between the second and third lenses.

* * * * *